US012634099B2

(12) United States Patent
Abedini et al.

(10) Patent No.: US 12,634,099 B2
(45) Date of Patent: May 19, 2026

(54) TECHNIQUES FOR FULL-DUPLEX OPERATION AT REPEATER NODES

(71) Applicant: QUALCOMM Incorporated, San Diego, CA (US)

(72) Inventors: Navid Abedini, Basking Ridge, NJ (US); Qian Zhang, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/425,281

(22) Filed: Jan. 29, 2024

(65) Prior Publication Data

US 2025/0247198 A1     Jul. 31, 2025

(51) Int. Cl.
*H04L 5/14* (2006.01)
*H04B 17/336* (2015.01)
*H04W 88/08* (2009.01)

(52) U.S. Cl.
CPC ............. *H04L 5/14* (2013.01); *H04B 17/336* (2015.01); *H04W 88/08* (2013.01)

(58) Field of Classification Search
CPC ..... H04L 5/14; H04B 17/336; H04B 7/15542; H04B 7/15528; H04W 88/08
USPC ........................................ 370/329
See application file for complete search history.

(56) References Cited

U.S. PATENT DOCUMENTS

| | | | | |
|---|---|---|---|---|
| 11,791,884 B2 * | 10/2023 | Zhang | .................. | H04B 7/0696 |
| | | | | 370/329 |
| 2019/0140811 A1 * | 5/2019 | Abedini | ................ | H04L 5/1438 |

| | | | | |
|---|---|---|---|---|
| 2021/0351832 A1 * | 11/2021 | Zhang | .................... | H04W 24/10 |
| 2022/0014954 A1 * | 1/2022 | Ibrahim | ................ | H04W 72/21 |
| 2022/0045775 A1 * | 2/2022 | Abedini | ................ | H04L 5/1461 |
| 2023/0247471 A1 | 8/2023 | Zhang et al. | | |
| 2024/0163058 A1 * | 5/2024 | Taghizadeh Motlagh | .................. | |
| | | | | H04L 5/0051 |
| 2024/0171252 A1 * | 5/2024 | Bhamri | .............. | H04B 7/06962 |

(Continued)

OTHER PUBLICATIONS

International Search Report and Written Opinion—PCT/US2025/ 010622—ISA/EPO—Apr. 29, 2025 (2400655WO).

*Primary Examiner* — Marnie A Matt
(74) *Attorney, Agent, or Firm* — Holland & Hart LLP/Qualcomm Incorporated

(57) ABSTRACT

Methods, systems, and devices for wireless communications are described in which a repeater may provide assistance information and configuration requests for full-duplex communications. The assistance information may include information about filtering capabilities of the repeater, such as sub-bands that can be filtered to avoid cross-link interference (CLI) or self-interference (SI), a width of a pass-band or transition band, a level of rejection associated with repeater filters, and the like. The assistance information may also indicate an amount of guard-band needed between uplink and downlink sub-bands, supported sub-bands, supported transmit power or amplification levels, phase continuity capabilities, transition times between full-duplex and non-full-duplex symbols, or any combinations thereof. Additionally, or alternatively, the assistance information may indicate support for multiplexing between mobile termination (MT) and forward (FWD) units at the repeater, and CLI measurements associated with MT and FWD unit multiplexing may be provided.

20 Claims, 18 Drawing Sheets

(56)                    References Cited

U.S. PATENT DOCUMENTS

2024/0243885 A1*   7/2024  Zheng ................. H04W 72/231
2024/0421882 A1*  12/2024  Cao ..................... H04W 72/046
2025/0158690 A1*   5/2025  Zheng ................ H04B 7/04013

* cited by examiner

Supported Full-Duplex Parameters 215

Configuration 225

200

130

105

115

Network
Entity

Transceiver

1310

Antenna

1315

Communications
Manager

1320

Memory

Code

1330

1325

1340

Processor

1335

1305

1300

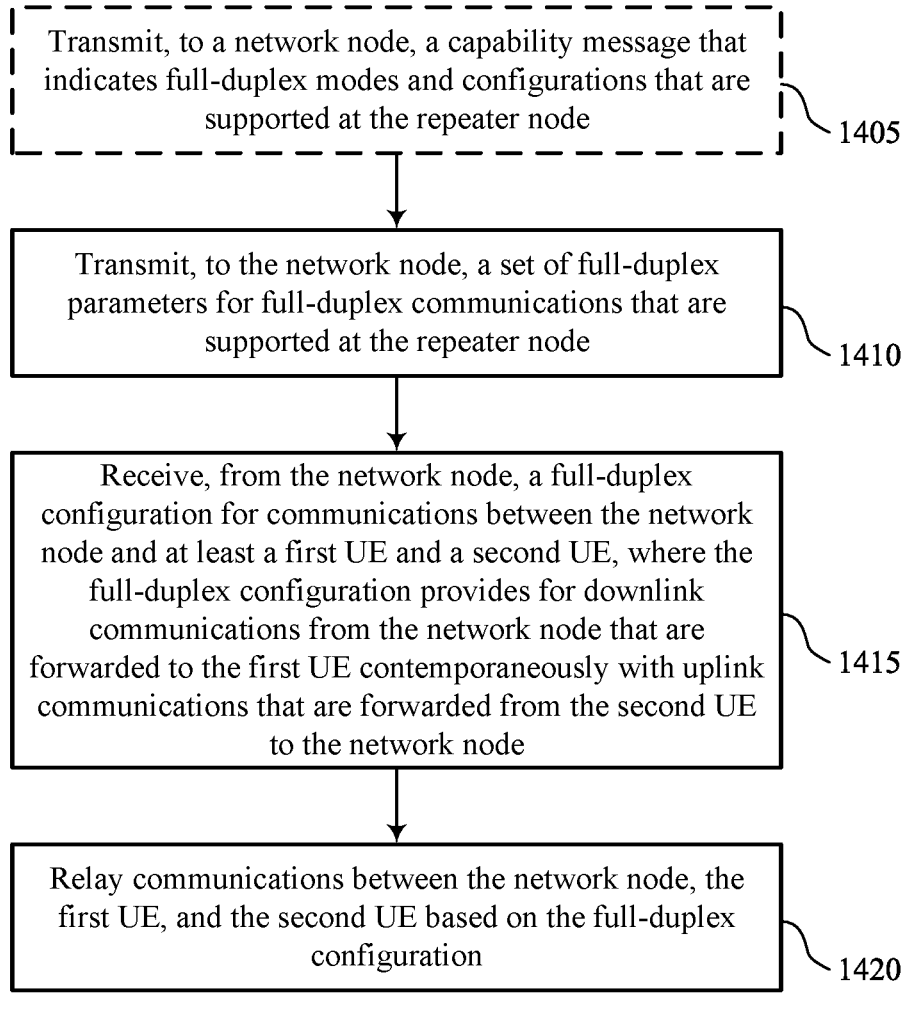

Transmit, to a network node, a capability message that indicates full-duplex modes and configurations that are supported at the repeater node

1405

Transmit, to the network node, a set of full-duplex parameters for full-duplex communications that are supported at the repeater node

1410

Receive, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node

1415

Relay communications between the network node, the first UE, and the second UE based on the full-duplex configuration

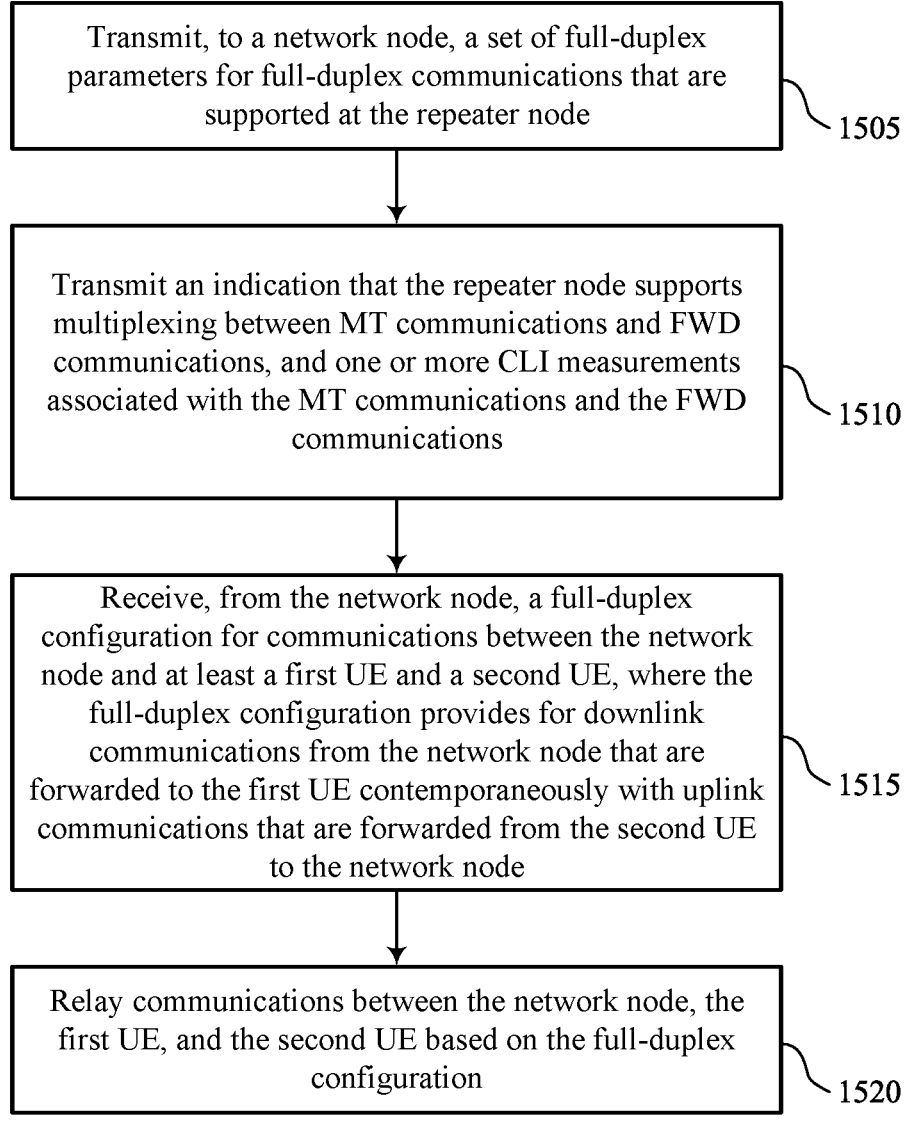

Transmit, to a network node, a set of full-duplex parameters for full-duplex communications that are supported at the repeater node
1505

Transmit an indication that the repeater node supports multiplexing between MT communications and FWD communications, and one or more CLI measurements associated with the MT communications and the FWD communications
1510

Receive, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node
1515

Relay communications between the network node, the first UE, and the second UE based on the full-duplex configuration
1520

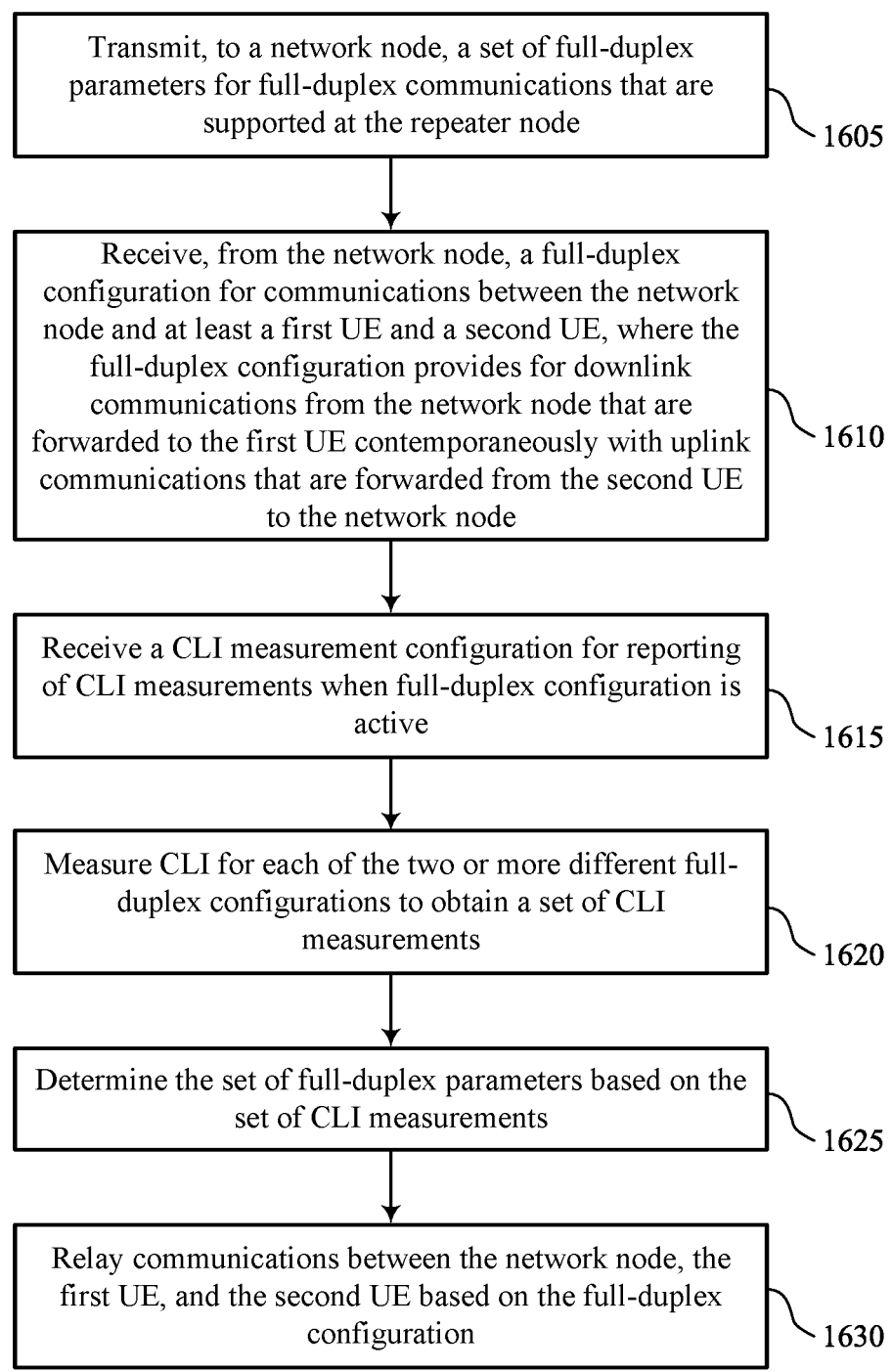

Transmit, to a network node, a set of full-duplex parameters for full-duplex communications that are supported at the repeater node

1605

Receive, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node

1610

Receive a CLI measurement configuration for reporting of CLI measurements when full-duplex configuration is active

1615

Measure CLI for each of the two or more different full-duplex configurations to obtain a set of CLI measurements

1620

Determine the set of full-duplex parameters based on the set of CLI measurements

1625

Relay communications between the network node, the first UE, and the second UE based on the full-duplex configuration

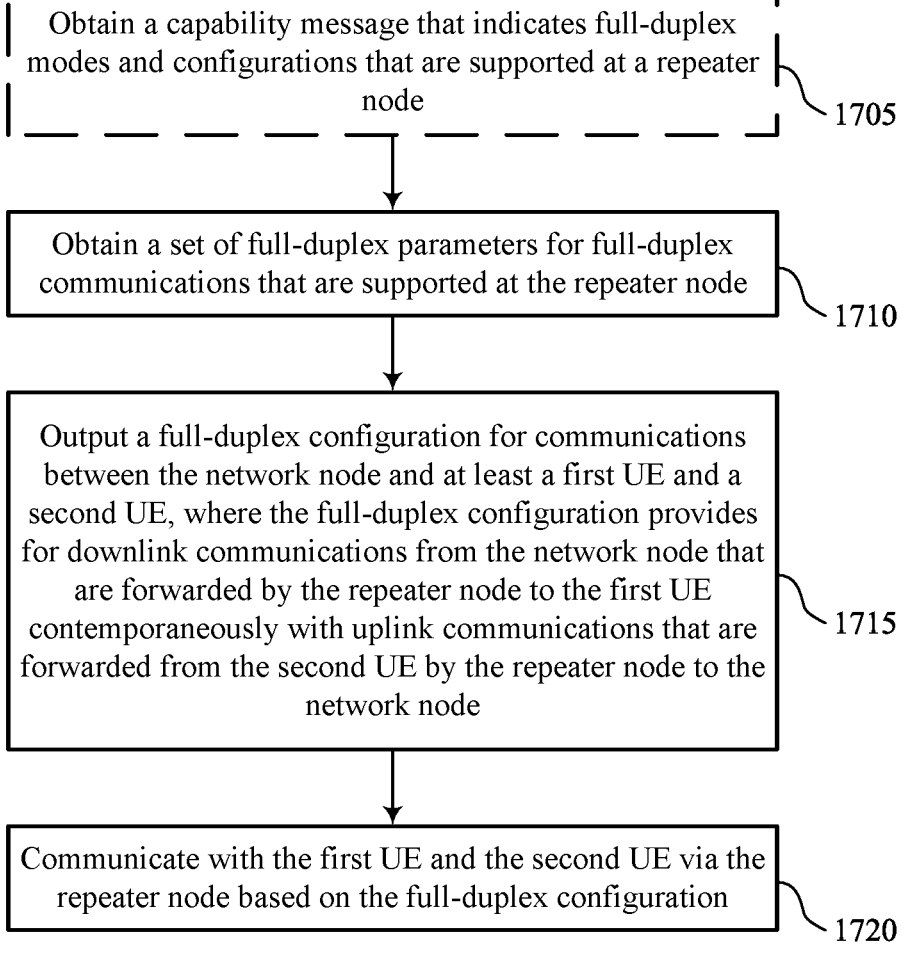

Obtain a capability message that indicates full-duplex modes and configurations that are supported at a repeater node ⟍ 1705

Obtain a set of full-duplex parameters for full-duplex communications that are supported at the repeater node ⟍ 1710

Output a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node ⟍ 1715

Communicate with the first UE and the second UE via the repeater node based on the full-duplex configuration ⟍ 1720

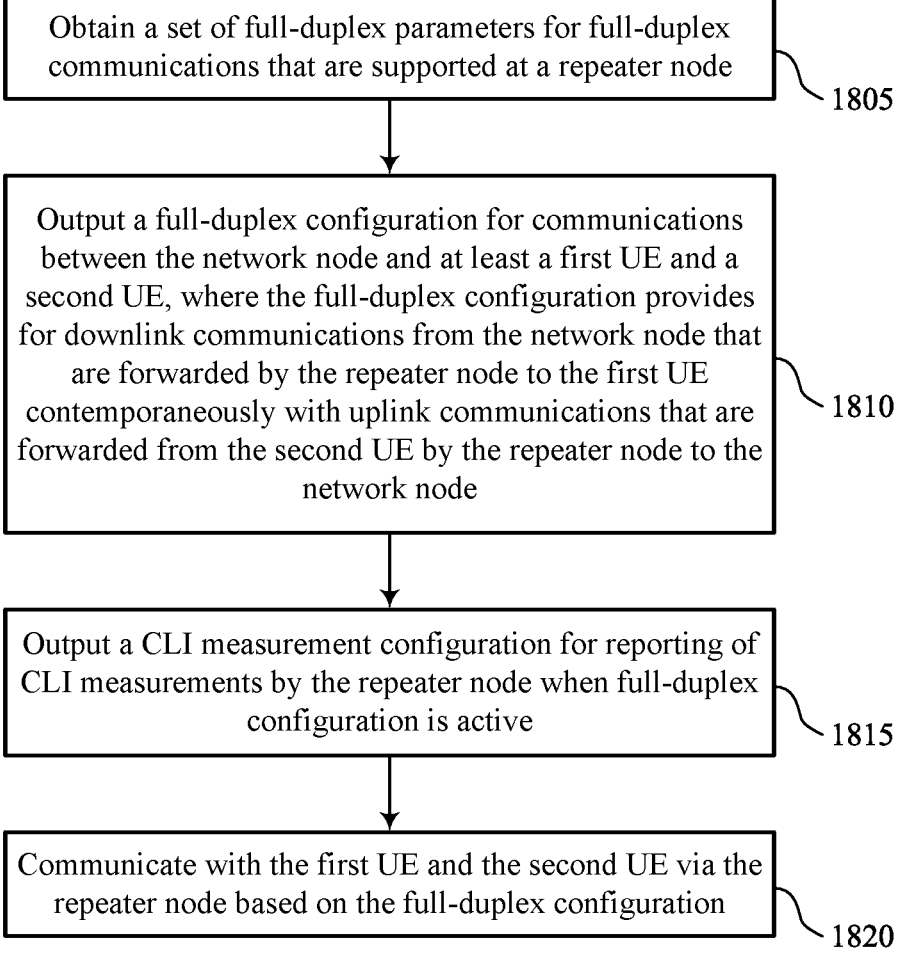

Obtain a set of full-duplex parameters for full-duplex communications that are supported at a repeater node

1805

Output a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node

1810

Output a CLI measurement configuration for reporting of CLI measurements by the repeater node when full-duplex configuration is active

1815

Communicate with the first UE and the second UE via the repeater node based on the full-duplex configuration

TECHNIQUES FOR FULL-DUPLEX OPERATION AT REPEATER NODES

FIELD OF TECHNOLOGY

The following relates to wireless communications, including techniques for full-duplex operation at repeater nodes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for full-duplex operation at repeater nodes. For example, the described techniques provide that a repeater may provide assistance information and configuration requests for full-duplex communications, such as sub-band full-duplex (SBFD) communications. In some aspects, the assistance information may include information about filtering capabilities of the repeater, such as sub-bands that can be filtered to reduce cross-link interference (CLI) or self-interference (SI), a width of a pass-band or transition band, a level of rejection associated with repeater filters, and the like. In some cases, the assistance information may also indicate an amount of guard-band needed between uplink and downlink sub-bands, supported sub-bands, supported transmit power or amplification levels, phase continuity capabilities, transition times between full-duplex and non-full-duplex symbols, or any combinations thereof. Additionally, or alternatively, the assistance information may indicate support for multiplexing between mobile termination (MT) and forward (FWD) units at the repeater, and CLI measurements associated with MT and FWD unit multiplexing may be provided.

A method for wireless communications by a repeater node is described. The method may include transmitting, to a network node, a set of full-duplex parameters for full-duplex communications that are supported at the repeater node, receiving, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node, and relaying communications between the network node, the first UE, and the second UE based on the full-duplex configuration.

A repeater node for wireless communications is described. The repeater node may include one or more memories storing processor executable code, and one or more processors coupled with the one or more memories. The one or more processors may individually or collectively be operable to execute the code to cause the repeater node to transmit, to a network node, a set of full-duplex parameters for full-duplex communications that are supported at the repeater node, receive, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node, and relay communications between the network node, the first UE, and the second UE based on the full-duplex configuration.

Another repeater node for wireless communications is described. The repeater node may include means for transmitting, to a network node, a set of full-duplex parameters for full-duplex communications that are supported at the repeater node, means for receiving, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node, and means for relaying communications between the network node, the first UE, and the second UE based on the full-duplex configuration.

A non-transitory computer-readable medium storing code for wireless communications is described. The code may include instructions executable by one or more processors to transmit, to a network node, a set of full-duplex parameters for full-duplex communications that are supported at the repeater node, receive, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node, and relay communications between the network node, the first UE, and the second UE based on the full-duplex configuration.

In some examples of the method, repeater nodes, and non-transitory computer-readable medium described herein, the set of full-duplex parameters indicate a filtering capability or a filtering response characteristic of the repeater node.

In some examples of the method, repeater nodes, and non-transitory computer-readable medium described herein, the set of full-duplex parameters indicate one or more of a set of sub-bands the repeater node can filter, a width of a pass-band or a transition-band the repeater node can filter, a level of rejection in the transition-band or a stop-band, or any combinations thereof. In some examples of the method, repeater nodes, and non-transitory computer-readable medium described herein, the set of full-duplex parameters indicate an amount of guard-band resources requested between sub-bands of a sub-band full-duplex configuration. In some examples of the method, repeater nodes, and non-transitory computer-readable medium described herein, the amount of guard-band resources are indicated for one or more beams or one or more transmit power levels.

In some examples of the method, repeater nodes, and non-transitory computer-readable medium described herein, the set of full-duplex parameters indicate a requested configuration for uplink and downlink sub-bands of a sub-band full-duplex configuration. In some examples of the method, repeater nodes, and non-transitory computer-readable medium described herein, the set of full-duplex parameters indicate a transmission power level or amplification level for one or more of uplink communications, downlink communications, one or more sub-bands, or any combinations thereof.

In some examples of the method, repeater nodes, and non-transitory computer-readable medium described herein, the set of full-duplex parameters indicate whether the repeater node can maintain phase-continuity across time-division duplex symbols and sub-band full-duplex symbols. In some examples of the method, repeater nodes, and non-transitory computer-readable medium described herein, the set of full-duplex parameters indicate a requested transition time between time-division duplex symbols and sub-band full-duplex symbols.

In some examples of the method, repeater nodes, and non-transitory computer-readable medium described herein, the transmitting the set of full-duplex parameters may include operations, features, means, or instructions for transmitting an indication that the repeater node supports multiplexing between mobile terminal unit (MT) communications and forward unit (FWD) communications, and one or more cross-link interference measurements associated with the MT communications and the FWD communications. In some examples of the method, repeater nodes, and non-transitory computer-readable medium described herein, the indication that the repeater node supports multiplexing between MT communications and FWD communications indicates support for one or more of time-division duplex (TDD) multiplexing of MT communications contemporaneously with wide-band time division duplexing (TDD) multiplexing of FWD communications, TDD multiplexing of MT communications contemporaneously with sub-band TDD multiplexing of FWD communications, or TDD multiplexing of MT communications contemporaneously with sub-band full-duplex (SBFD) multiplexing of FWD communications.

Some examples of the method, repeater nodes, and non-transitory computer-readable medium described herein may further include operations, features, means, or instructions for transmitting, to the network node, a capability message that indicates full-duplex modes and configurations that are supported at the repeater node. In some examples of the method, repeater nodes, and non-transitory computer-readable medium described herein, the set of full-duplex parameters are provided based on the full-duplex modes and configuration supported at the repeater node.

Some examples of the method, repeater nodes, and non-transitory computer-readable medium described herein may further include operations, features, means, or instructions for receiving a cross-link interference (CLI) measurement configuration for reporting of CLI measurements when full-duplex configuration is active. In some examples of the method, repeater nodes, and non-transitory computer-readable medium described herein, the CLI measurement configuration indicates different sets of CLI measurements is to be reported based for two or more different full-duplex configurations. Some examples of the method, repeater nodes, and non-transitory computer-readable medium described herein may further include operations, features, means, or instructions for measuring CLI for each of the two or more different full-duplex configurations to obtain a set of CLI measurements and determining the set of full-duplex parameters based on the set of CLI measurements. In some examples of the method, repeater nodes, and non-transitory computer-readable medium described herein, the different sets of CLI measurements are based on a capability of a mobile terminal unit (MT) at the repeater node and a mode of operation of a forward unit at the repeater node.

In some examples of the method, repeater nodes, and non-transitory computer-readable medium described herein, the CLI measurements include one or more of received signal strength indicator (RSSI) measurements for one or more downlink sub-bands, reference signal received power (RSRP) measurements for one or more uplink sub-bands, RSSI measurements for one or more uplink sub-bands, separate measurement for non-contiguous downlink sub-bands, or any combinations thereof. In some examples of the method, repeater nodes, and non-transitory computer-readable medium described herein, the CLI measurement configuration indicates a mobile terminal unit (MT) at the repeater node is to transmit an uplink reference signal while a forward unit at the repeater node transmits downlink signals in wide-band or one or more sub-bands.

In some examples of the method, repeater nodes, and non-transitory computer-readable medium described herein, the full-duplex configuration includes one or more of a beam indication, power configuration, timing configuration, or any combinations thereof, for one or more sub-bands, group of sub-bands, beam directions, or any combinations thereof.

A method for wireless communications by a network node is described. The method may include obtaining a set of full-duplex parameters for full-duplex communications that are supported at a repeater node, outputting a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node, and communicating with the first UE and the second UE via the repeater node based on the full-duplex configuration.

A network node for wireless communications is described. The network node may include one or more memories storing processor executable code, and one or more processors coupled with the one or more memories. The one or more processors may individually or collectively be operable to execute the code to cause the network node to obtain a set of full-duplex parameters for full-duplex communications that are supported at a repeater node, output a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node, and communicate with the first UE and the second UE via the repeater node based on the full-duplex configuration.

Another network node for wireless communications is described. The network node may include means for obtaining a set of full-duplex parameters for full-duplex communications that are supported at a repeater node, means for outputting a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node, and means for communicating with the first UE and the second UE via the repeater node based on the full-duplex configuration.

A non-transitory computer-readable medium storing code for wireless communications is described. The code may include instructions executable by one or more processors to obtain a set of full-duplex parameters for full-duplex communications that are supported at a repeater node, output a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node, and communicate with the first UE and the second UE via the repeater node based on the full-duplex configuration.

In some examples of the method, network nodes, and non-transitory computer-readable medium described herein, the set of full-duplex parameters indicate a filtering capability or a filtering response characteristic of the repeater node.

In some examples of the method, network nodes, and non-transitory computer-readable medium described herein, the set of full-duplex parameters indicate one or more of a set of sub-bands the repeater node can filter, a width of a pass-band or a transition-band the repeater node can filter, a level of rejection in the transition-band or a stop-band, or any combinations thereof. In some examples of the method, network nodes, and non-transitory computer-readable medium described herein, the set of full-duplex parameters indicate an amount of guard-band resources requested between sub-bands of a sub-band full-duplex configuration. In some examples of the method, network nodes, and non-transitory computer-readable medium described herein, the amount of guard-band resources is indicated for one or more beams or one or more transmit power levels.

In some examples of the method, network nodes, and non-transitory computer-readable medium described herein, the set of full-duplex parameters indicate a requested configuration for uplink and downlink sub-bands of a sub-band full-duplex configuration. In some examples of the method, network nodes, and non-transitory computer-readable medium described herein, the set of full-duplex parameters indicate a transmission power level or amplification level for one or more of uplink communications, downlink communications, one or more sub-bands, or any combinations thereof.

In some examples of the method, network nodes, and non-transitory computer-readable medium described herein, the set of full-duplex parameters indicate whether the repeater node can maintain phase-continuity across time-division duplex symbols and sub-band full-duplex symbols. In some examples of the method, network nodes, and non-transitory computer-readable medium described herein, the set of full-duplex parameters indicate a requested transition time between time-division duplex symbols and sub-band full-duplex symbols.

In some examples of the method, network nodes, and non-transitory computer-readable medium described herein, the obtaining the set of full-duplex parameters may include operations, features, means, or instructions for obtaining an indication that the repeater node supports multiplexing between MT communications and FWD communications, and one or more cross-link interference measurements associated with the MT communications and the FWD communications. In some examples of the method, network nodes, and non-transitory computer-readable medium described herein, the indication that the repeater node supports multiplexing between MT communications and FWD communications indicates support for one or more of TDD multiplexing of MT communications contemporaneously with wide-band TDD multiplexing of FWD communications, TDD multiplexing of MT communications contemporaneously with sub-band TDD multiplexing of FWD communications, or TDD multiplexing of MT communications contemporaneously with SBFD multiplexing of FWD communications.

Some examples of the method, network nodes, and non-transitory computer-readable medium described herein may further include operations, features, means, or instructions for obtaining a capability message that indicates full-duplex modes and configurations that are supported at the repeater node. In some examples of the method, network nodes, and non-transitory computer-readable medium described herein, the set of full-duplex parameters are provided based on the full-duplex modes and configuration supported at the repeater node.

Some examples of the method, network nodes, and non-transitory computer-readable medium described herein may further include operations, features, means, or instructions for outputting a CLI measurement configuration for reporting of CLI measurements by the repeater node when full-duplex configuration are active. In some examples of the method, network nodes, and non-transitory computer-readable medium described herein, the CLI measurement configuration indicates different sets of CLI measurements are to be reported based for two or more different full-duplex configurations. In some examples of the method, network nodes, and non-transitory computer-readable medium described herein, the different sets of CLI measurements are based on a capability of a mobile terminal unit at the repeater node and a mode of operation of a forward unit at the repeater node.

In some examples of the method, network nodes, and non-transitory computer-readable medium described herein, the CLI measurements include one or more of RSSI measurements for one or more downlink sub-bands, RSRP measurements for one or more uplink sub-bands, RSSI measurements for one or more uplink sub-bands, separate measurement for non-contiguous downlink sub-bands, or any combinations thereof. In some examples of the method, network nodes, and non-transitory computer-readable medium described herein, the CLI measurement configuration indicates a mobile terminal unit at the repeater node is to transmit an uplink reference signal while a forward unit at the repeater node transmits downlink signals in wide-band or one or more sub-bands.

In some examples of the method, network nodes, and non-transitory computer-readable medium described herein, the full-duplex configuration includes one or more of a beam indication, power configuration, timing configuration, or any combinations thereof, for one or more sub-bands, group of sub-bands, beam directions, or any combinations thereof.

BRIEF DESCRIPTION OF THE DRAWINGS

FIGS. 14 through 18 show flowcharts illustrating methods that support techniques for full-duplex operation at repeater nodes in accordance with one or more aspects of the present disclosure.

DETAILED DESCRIPTION

Figure 1:
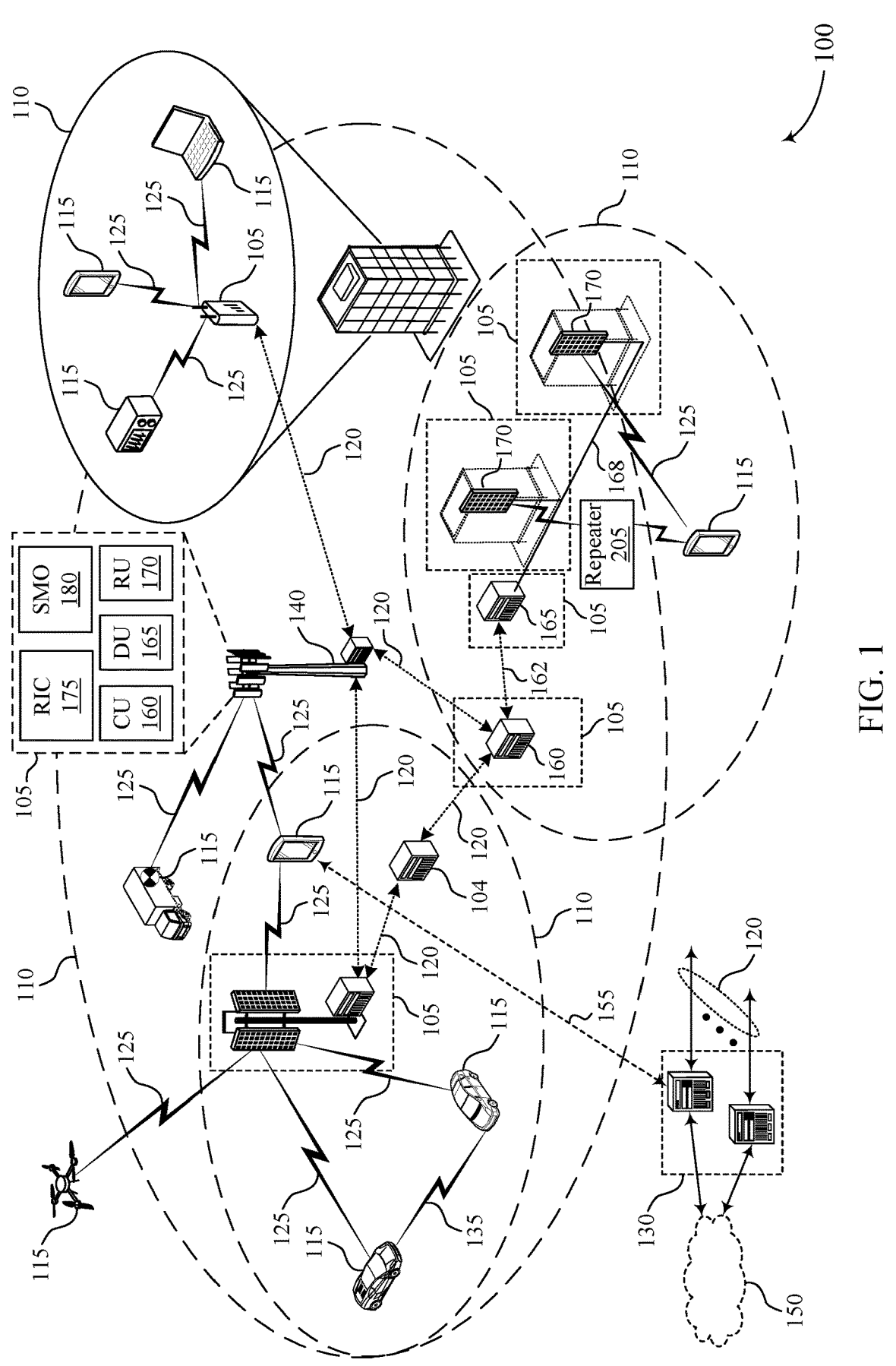
FIG. 1 shows an example of a wireless communications system that supports techniques for full-duplex operation at repeater nodes in accordance with one or more aspects of the present disclosure.

In some systems, one or more devices, such as a network entity or a user equipment (UE), may operate in a full-duplex mode (also referred to as FD mode) in which the one or more devices transmit signals and receive signals using a same set of wireless resources (e.g., a same set of time and frequency resources). When a device is operating in full-duplex mode, concurrent transmission and reception may result in self-interference where transmitted signals interfere with signals that are to be concurrently received, cross-link interference (CLI) from other transmitters, or both. Such interference may reduce the likelihood of successful reception and decoding of communications, and various techniques to mitigate such interference may be implemented in order to enhance reliability of communications (e.g., higher transmission power during periods of full-duplex operation, reduced coding rates or modulation orders, beam selection to avoid interfering beams, or any combinations thereof).

Full-duplex communications, in some deployments, may include sub-band full duplex (SBFD) in which a bandwidth part may be configured for full-duplex communications. In SBFD, the bandwidth part may be divided into downlink frequency resources and uplink frequency resources. For example, one or more frequency sub-bands may be for uplink communications and one or more other frequency sub-bands may be for downlink communications. In some cases, the uplink frequency sub-band(s) and the downlink frequency sub-band(s) may be non-overlapping, although techniques as discussed herein may be used in cases where downlink and uplink frequency sub-bands may be partially or fully overlapping.

Further, in some deployments, a wireless network may include one or more network controlled repeaters, and a network entity (e.g., a gNB), may perform communications with wireless devices (e.g., UEs) via the repeaters. For example, each repeater may include a mobile termination (MT) unit and a forward (FWD) unit. The MT unit may transmit and receive information related to control and operation of the repeater, and the FWD unit forward transmissions between the network entity and wireless devices, such as UEs.

Various techniques discussed herein provide for use of repeaters in deployments that also use full-duplex communications. In some aspects, described techniques provide that a repeater may provide, to a network entity, assistance information and configuration requests for full-duplex communications, such as sub-band full-duplex (SBFD) communications. In some aspects, the assistance information may include information about filtering capabilities of the repeater, such as sub-bands that can be filtered to reduce or mitigate cross-link interference (CLI) or self-interference (SI), a width of a pass-band or transition band, a level of rejection associated with repeater filters, and the like. In some cases, the assistance information may also indicate an amount of guard-band needed between uplink and downlink sub-bands, supported sub-bands, supported transmit power or amplification levels, phase continuity capabilities, transition times between full-duplex and non-full-duplex symbols, or any combinations thereof. Additionally, or alternatively, the assistance information may indicate support for multiplexing between MT and FWD units at the repeater, and CLI measurements associated with MT and FWD unit multiplexing may be provided. The assistance information may also provide a beam indication (access and/or backhaul links), power configuration, timing configuration, or any combinations thereof, which may be provided per sub-band, per group of sub-bands, or per direction.

Techniques as discussed herein may thus provide for indication of full-duplex capabilities at repeater nodes, which may help enhance network efficiency and throughput. Further, relaying of full-duplex communications may generate additional CLI and SI for the communications, and techniques to manage such interference may help to mitigate impact of such interference on communications, and enhance reliability and throughout.

Aspects of the disclosure are initially described in the context of wireless communications systems. Aspects of the disclosure are further illustrated by and described with reference to full-duplex resources, process flows, apparatus diagrams, system diagrams, and flowcharts that relate to techniques for full-duplex operation at repeater nodes.

FIG. 1 shows an example of a wireless communications system 100 that supports techniques for full-duplex operation at repeater nodes in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some aspects, wireless communications system 100 may include one or more repeater nodes 205. In some aspects, a repeater node 205 may provide assistance information and configuration requests for full-duplex communications, such as SBFD communications. In some cases, the assistance information may include information about filtering capabilities of the repeater 205, such as sub-bands that can be filtered to reduce CLI or SI, a width of a pass-band or transition band, a level of rejection associated with repeater filters, and the like. In some cases, the assistance information may also indicate an amount of guard-band needed between uplink and downlink sub-bands, supported sub-bands, supported transmit power or amplification levels, phase continuity capabilities, transition times between full-duplex and non-full-duplex symbols, or any combinations thereof. Additionally, or alternatively, the assistance information may indicate support for multiplexing between MT and FWD units at the repeater 205, and CLI measurements associated with MT and FWD unit multiplexing may be provided.

Figure 2:
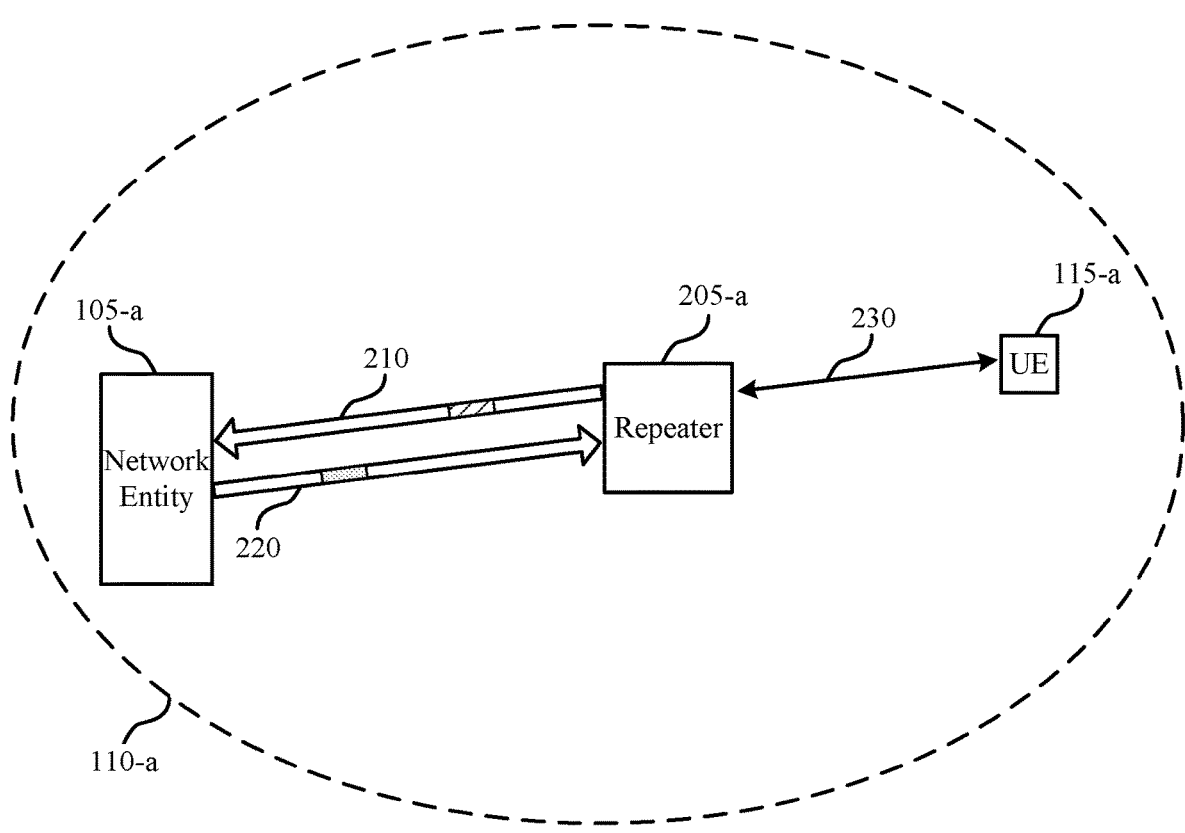
FIG. 2 shows an example of a wireless communications system that supports techniques for full-duplex operation at repeater nodes in accordance with one or more aspects of the present disclosure.

FIG. 2 shows an example of a wireless communications system 200 that supports techniques for full-duplex operation at repeater nodes in accordance with one or more aspects of the present disclosure. In some examples, wireless communications system 200 may implement aspects discussed with respect to the wireless communications system 100 illustrated in FIG. 1. For instance, wireless communications system 200 may include a network entity 105-a and a UE 115-a, which may be examples of a network entity 105 and UE 115 as described with reference to FIG. 1. Network entity 105-a may communicate with one or more UEs 115 in coverage area 110-a. In some cases, communications may be relayed from the network entity 105-a to UEs 115 (and vice versa) by one or more repeaters 205-a (e.g., wireless repeaters), which may be an example of a repeater node 205 described with reference to FIG. 1. In the example of FIG. 2, repeater 205-a relay uplink communications from one or more UEs 115 to the network entity 105-a via communications link 230 and uplink channel 210, and may relay downlink communications from the network entity 105-a to the one or more UEs 115 via downlink channel 220 and the communications link 230.

In some aspects, the repeater 205-a may transmit assistance information that indicates one or more supported full-duplex parameters 215 via uplink channel 210, and may receive configuration information 225 for full-duplex communications via downlink channel 220. As discussed herein, repeaters 205 may relay signals between a network entity 105 and UEs 115 to enhance coverage for UEs 115, such as by avoiding or reducing blockage or interference. For example, in some cases, there may be an object blocking a signal being transmitted from the network entity 105-a to the UE 115-a, or vice versa. The object may be a physical object or, in some cases, may be a frequency jammer, such as an RF jammer. Physical objects that may block transmitted signals may include hills, mountains, buildings, walls, other infrastructure, etc. A RF jammer may function by targeting, interfering with, blocking, or jamming, certain frequencies on which transmissions may be sent. As an example, an RF jammer may include another wireless device (e.g., other network entity 105, UEs 115, etc.), other types of transmissions or signals (e.g., radar, satellite, etc.), or the like. RF jammers may include RF jammers that affect transmissions through adjacent channel selectivity (ACS) jamming, in-band blocking (IBB), and out-of-band (OOB) jamming.

In the example of FIG. 2, the repeater 205-a may repeat, extend, or redirect wireless signals received from network entity 105-a to UE 115-a, from UE 115-a to network entity 105-a, or between other wireless devices. For example, the repeater 205-a may receive a signal from the network entity 105-a and retransmit the signal to a UE 115-a, or receive a signal from UE 115-a and retransmit the signal to network entity 105-a. In some examples, the repeater 205-a may amplify and forward (e.g., amplify and transmit) signals transmitted between the network entity 105-a and the UE 115-a. In cases where transmissions from the network entity 105-a to the UE 115-a (and vice versa) are blocked due to physical barriers or are associated with path loss influenced by various factors (e.g., such as distance between the base station and UE, temperature, barometric pressure, diffraction, blockage, etc.), the repeater 205-a may receive signals transmitted between the network entity 105-a and the UE 115-a, amplify received signals, and forward the amplified signals to facilitate efficient communications between the network entity 105-a and the UE 115-a.

Figure 3:
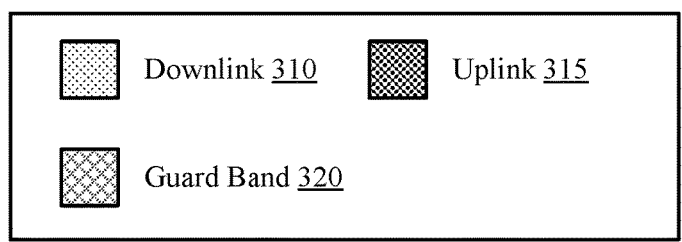
FIG. 3 shows an example of a sub-band full duplex configuration that supports techniques for full-duplex operation at repeater nodes in accordance with one or more aspects of the present disclosure.
Figure 3:
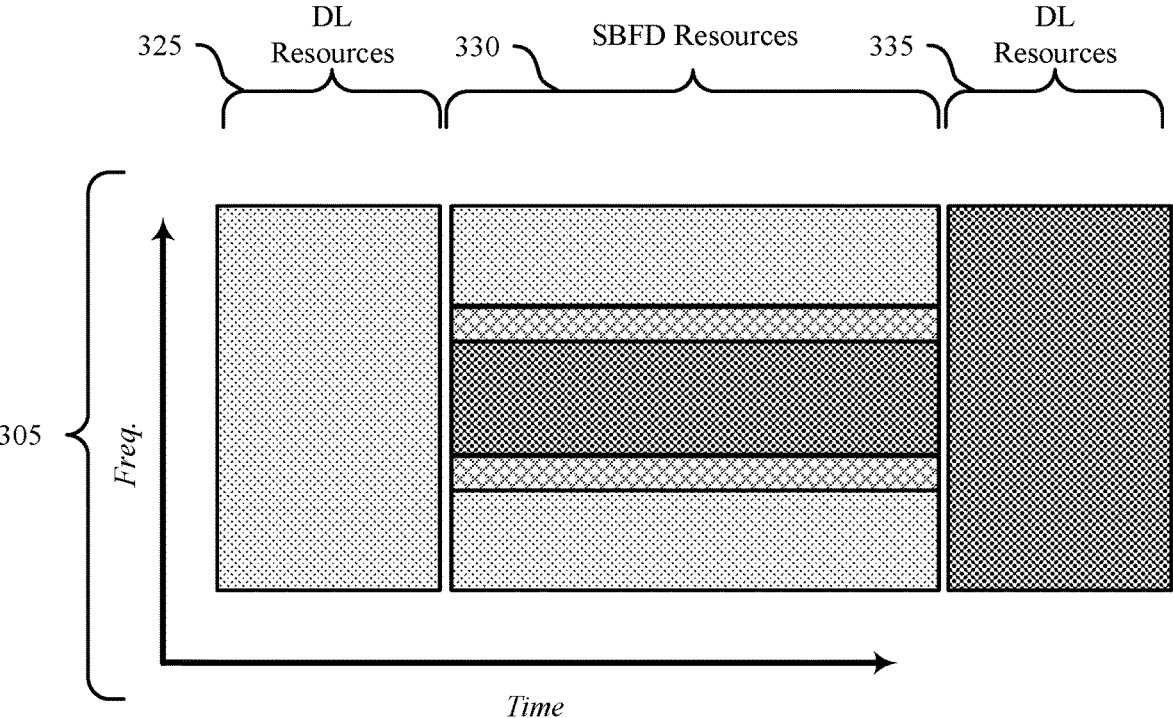
Figure 4:
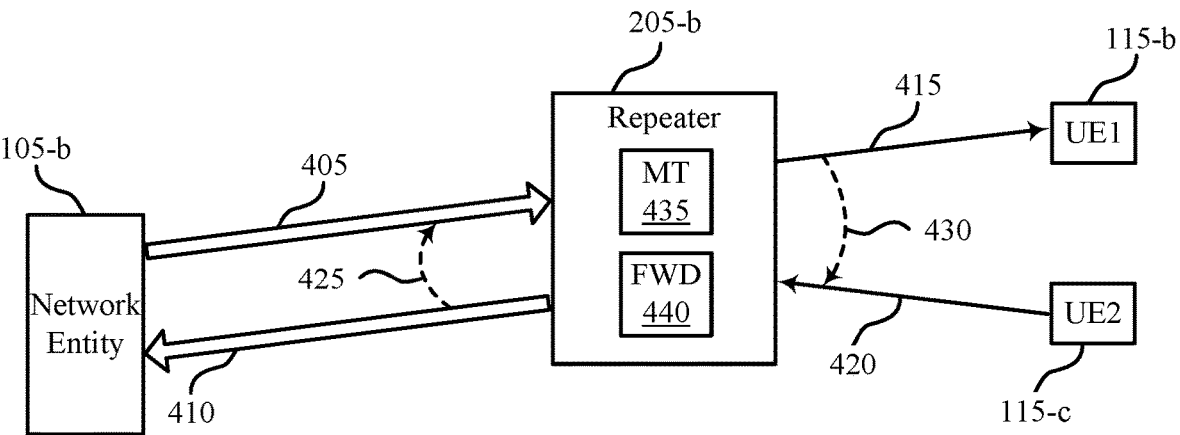
FIG. 4 shows an example of a wireless communications system that includes a repeater with cross-link interference that supports techniques for full-duplex operation at repeater nodes in accordance with one or more aspects of the present disclosure.

In some aspects, the repeater 205-a may operate to repeat signals in accordance with full-duplex communications (e.g., SBFD communications). FIG. 3 provides an example of wireless resources configured for SBFD communications, and FIG. 4 provides an example of repeating signals in accordance with full-duplex communications. The repeater 205-a, in some aspects, may include a MT unit and, using configuration information 225 acquired by the MT unit, may forward communications between the network entity 105-a and UE 115-a using a FWD unit, in accordance with a full-duplex configuration (e.g., a SBFD configuration).

FIG. 3 shows an example of a SBFD configuration 300 that supports techniques for full-duplex operation at repeater nodes in accordance with one or more aspects of the present disclosure. In some examples, the SBFD configuration 300 may implement aspects of wireless communications system 100 and wireless communications system 200, as described with reference to FIGS. 1 and 2. For instance, a network entity (e.g., a network entity 105 as discussed herein) may transmit downlink communications to a first UE (e.g., a UE 115 as discussed herein) via a repeater (e.g., a repeater 205 as discussed herein) while concurrently receiving uplink communications from a second UE via the repeater.

In the example of FIG. 3, a bandwidth part 305 may include downlink resource 310, uplink resources 315, and guard band resources 320. For example, during a first time period 325 the bandwidth part 305 may provide downlink resources 310 only, and during a third time period 335 the bandwidth part 305 may provide uplink resources 315 only. During a second time period 330 that is configured for SBFD communications, the bandwidth part 305 may provide a first subset of frequency resources as downlink resources 310, and a second subset of frequency resources at uplink resources 315. In this example, guard band resources 320 may separate the downlink resources 310 and the uplink resources 315. When operating according to a SBFD configuration in which uplink communications are being repeated concurrently with downlink communications, a repeater may experience CLI. An example of CLI associated with a repeater is discussed with reference to the example of FIG. 4.

FIG. 4 shows an example of a wireless communications system 400 that includes a repeater with CLI, that supports techniques for full-duplex operation at repeater nodes in accordance with one or more aspects of the present disclosure. In some examples, the wireless communications system 400 may implement aspects discussed with respect to the wireless communications system 100 or 200 illustrated in FIGS. 1 and 2. For instance, wireless communications system 400 may include a network entity 105-*b* and a first UE 115-*b*, a second UE 115-*c*, and a repeater 205-*b*, which may be examples of a network entity 105, UE 115, and repeater 205 as described with reference to FIGS. 1 and 2. Network entity 105-*b* may communicate with the first UE 115-*b* and the second UE 115-*c* via repeater 205-*b*.

In the example of FIG. 4, repeater 205-*b* relay downlink communications received via downlink channel 405 to the first UE 115-*b* via a downlink connection 415, and may relay uplink communications received via uplink connection 420 from the second UE 115-*c* to the network entity 105-*b* via uplink channel 410. When the repeater 205-*b* operates to repeat full-duplex communications, the downlink communications are relayed concurrently with the uplink communications, which may introduce additional CLI and SI relative to cases where the repeater 205-*b* only repeats half-duplex communications. For example, a SI 425 may be present between the uplink channel 410 and the downlink channel 405. Further, this SI 425 may be amplified and forwarded via downlink connection 415 to the first UE 115-*b*. This amplified SI 425 may be additive to CLI 430 between the downlink connection 415 and the uplink connection 420. Additionally, the CLI 430 may also be amplified and forwarded via uplink channel 410, thus providing a potential feedback loop of interference. Further, in this example, the repeater 205-*b* includes a MT unit 435 and a FWD unit 440. In some cases, communications with the MT unit 435 may also be concurrent with repeated communications of the FWD unit 440, which may further generate CLI.

The amount of this CLI and SI generated from concurrent uplink and downlink communications at the repeater 205-*b* may depend on multiple factors. Such factors may include, for example, sub-band filtering capability to the repeater 205-*b*, an amount of amplification gain in each direction, the effective timing difference between uplink and downlink signals (e.g., that are impacted by internal delay of the repeater 205-*b*), associated beams that are repeated, or any combinations thereof. In accordance with various aspects discussed herein, the repeater 205-*b* may provide assistance information or full-duplex configuration requests, or both, to the network entity 105-*b*. In some cases, the assistance information, full-duplex configuration requests, or both, may be provided by the repeater 205-*b* (e.g., the MT unit 435 may provide the assistance information, full-duplex configuration requests, or both), by an operations and management (OAM) node of the wireless communications system 400, or any combinations thereof.

In some aspects, the assistance information may include, for example, information about the repeater 205-*b* filtering capability, filtering response, or both. For example, the repeater 205-*b* may provide an indication of which sub-bands it can filter, how wide an associated filter pass-band or transition band can be, a level of rejection in a transition or stop-band, or any combinations thereof. In some cases, the assistance information or full-duplex configuration request may include an amount of guard-band (e.g., between downlink and uplink sub-bands) requested. For example, the amount of guard-band may be beam-specific, transmit-power-level specific, or any combinations thereof. In some cases, request may be conditional (e.g., the default guard band can be the same as network entity 105-*b* guard band configuration, and if more resource blocks (RBs) would be beneficial as guard band at the repeater 205-*b*, the request may be provided). In some aspects, the full-duplex configuration request may include a requested downlink and uplink sub-band configuration (e.g., in terms frequency domain locations), which may be beam-specific, transmit power specific, or both. Further, in some aspects, the full-duplex configuration request may include a requested level of transmit power or amplification (e.g., in each of downlink (DL) and uplink (UL) directions and/or associated sub-bands).

In some cases, the assistance information or full-duplex configuration request may depend on the underlying SBFD configuration (e.g., different power configurations for different SBFD configurations). Additionally, or alternatively, the assistance information or full-duplex configuration request may indicate whether the repeater 205-*b* is able to maintain phase continuity across time division duplexing (TDD) symbols without SBFD, and SBFD symbols. Additionally, or alternatively, the assistance information or full-duplex configuration request may indicate an amount of time the repeater 205-*b* uses for transitions between TDD and SBFD symbols or between different active sub-band configurations.

In some aspects, additionally, or alternatively, the repeater 205-*b* may support enhanced multiplexing between the MT unit 435 and FWD unit 440, and may provide associated CLI measurements. For example, the repeater 205-*b* may time-division duplex MT unit 435 communications (e.g., MT DL (or UL) in a DL (or UL) sub-band within SBFD symbols) concurrently with wide-band TDD FWD unit 440 communications in the other direction (e.g., FWD unit 440 forwards wide-band UL (or DL)). In another example, the repeater 205-*b* may time-division duplex MT unit 435 communications (e.g., MT unit 435 DL (or UL) in a DL (or UL) sub-band within SBFD symbols) concurrently with sub-band TDD FWD unit 440 communications in the other direction (e.g., FWD unit 440 forwards UL (or DL) sub-bands). In a further example, the repeater 205-*b* may time-division duplex MT unit 435 communications (e.g., MT DL (or UL) in a DL (or UL) sub-band within SBFD symbols) concurrently with SBFD FWD unit 440 communications (e.g., FWD unit 440 forwards UL and DL sub-bands).

In some aspects, the repeater 205-*b* may provide capability signaling to the network entity 105-*c* of the supported modes or configurations for multiplexing between MT unit 435 and FWD unit 440 communications. For example, the capability signaling may be provided by the repeater 205-*b*, or by an OAM node. In some examples, based on such capabilities, the operation of MT unit 435 and the FWD unit 440 when both are active may be determined (e.g., via preconfigured rules, the repeater 205-*b* may determine its operation based on its capability and a state of the MT unit 435, a state of the FWD unit 440, or any combinations thereof). In some cases, the MT unit 435 may be configured to do CLI measurements, and provide a measurement report, when the FWD unit 440 is active. In some cases, the FWD unit 440 may be configured to forward wide-band or a set of uplink sub-bands, and the MT unit 435 may perform (and report) different sets of measurements depending on the FWD unit 440 configuration. In some examples, the repeater 205-*b* may autonomously run measurements to come up with a dynamic capability and provide assistance information to the network entity 105-*b*, or autonomously adjust its time, beam, and/or power configuration.

In some aspects, the MT unit 435, when the FWD unit 440 is active and forwarding, may be configured to provide various measurements (e.g., depending in the MT unit 435 capability and/or FWD unit 440 mode of operation). For example, the MT unit 435 may be configured to measure and report, for example, received signal strength indicator (RSSI) within DL sub-band(s), reference signal received power (RSRP) within UL sub-band(s), RSSI within UL sub-band(s), or any combinations thereof. In case of a SBFD configuration that includes two downlink sub-bands and one uplink sub-band, wherein the downlink sub-bands are non-contiguous, the MT unit 435 may provide separate CLI-RSSI measurement resources and reports in each downlink sub-band, may provide CLI-RSSI measurement resources and reports in one DL sub-band only, or may provide CLI-RSSI measurement resources and reports based on non-contiguous CLI-RSSI resource across downlink sub-bands. In some cases, the MT unit 435 at the repeater 205-*b* may be configured to perform such measurements while the collocated FWD unit 440 is configured to forward signals in different sub-bands. In some cases, in order to measure CLI caused by the MT unit 435 while the FWD unit 440 is active (e.g., in DL), the network entity 105-*b* may configure the MT unit 435 to send an uplink signal (e.g., such as a sounding reference signal (SRS)), and the FWD unit 440 may forward signals in wide-band downlink sub-bands or UL sub-bands, and other UEs/MTs being configured to do CLI measurements.

In some additional aspects, the repeater 205-*b* may provide one or more of a beam indication (e.g., for an access beam or backhaul beam) of one or more preferred beams, a preferred power configuration, a preferred timing configuration, or any combinations thereof, for repeating communications. In some cases, such information may be provided per sub-band, per group of sub-bands, per direction, or any combinations thereof. For example, the information may be applicable to some or all DL sub-bands, or some or all UL-sub-bands, in a particular direction.

Figure 5:
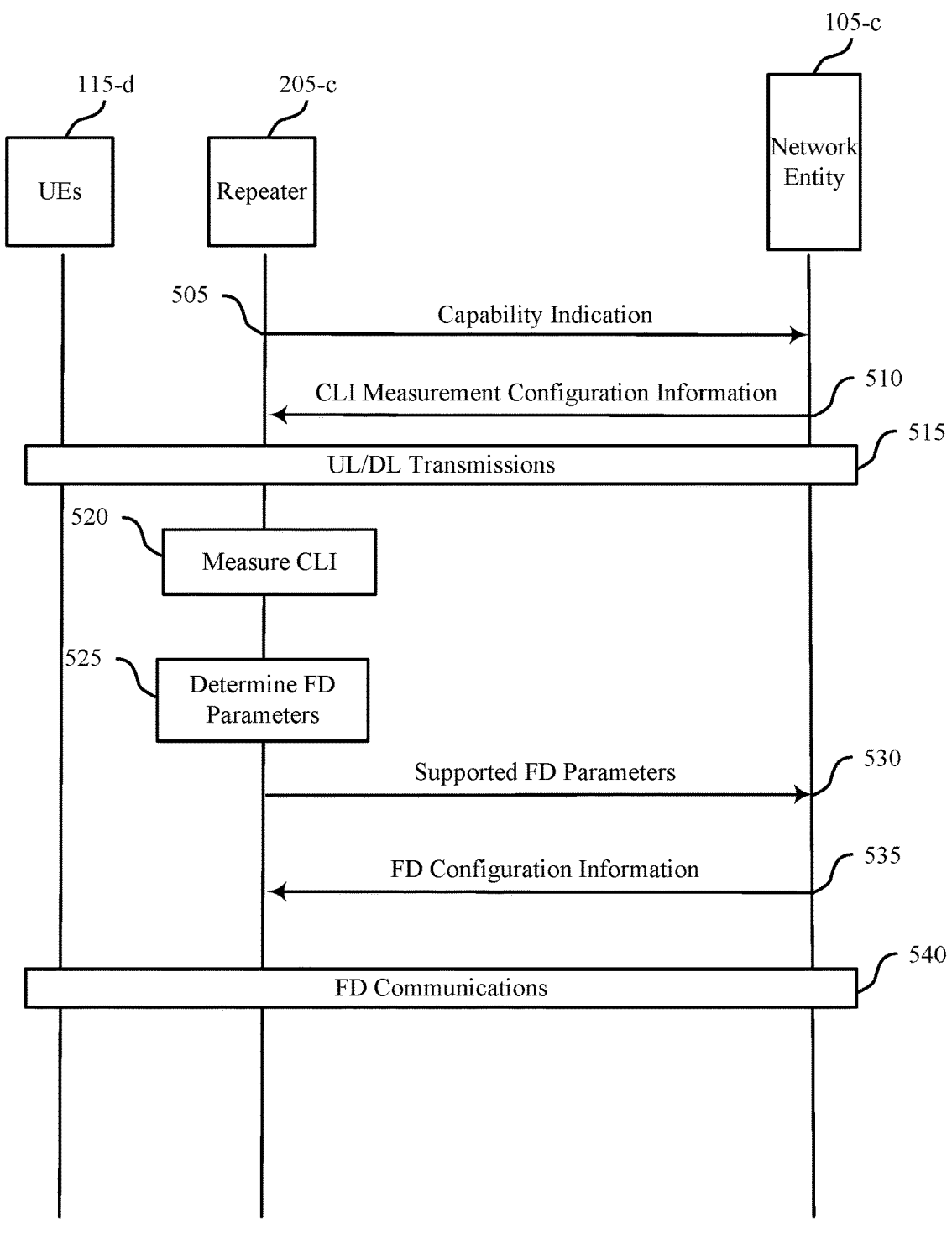
FIG. 5 shows an example of a process flow that supports techniques for full-duplex operation at repeater nodes in accordance with one or more aspects of the present disclosure.

FIG. 5 shows an example of a process flow 500 that supports techniques for full-duplex operation at repeater nodes in accordance with one or more aspects of the present disclosure. In some examples, the process flow 500 may implement aspects of the wireless communications system 100, the wireless communications systems 200, or the wireless communications system 400. Additionally, the process flow 500 may illustrate an example of a repeater 205-*c*, which may be an example of the repeater 205 as described herein. The process flow 500 may also illustrate an example of a network entity 105-*c* and a UE 115-*d*, which may be examples of network entities 105 and UEs 115, as described herein. Alternative examples of the following may be implemented, where some processes are performed in a different order than described or are not performed. In some cases, processes may include additional features not mentioned below, or further processes may be added.

At 505, the repeater 205-*c* may transmit, and the network entity 105-*c* may receive, a capability indication of the repeater 205-*c*. In some cases, the capability indication may indicate one or more capabilities of the repeater for repeating full-duplex communications, for multiplexing MT and FWD unit communications, for providing CLI measurements, or any combinations thereof.

At 510, the network entity 105-*c* may transmit, and the repeater 205-*c* may receive, CLI measurement configuration information. For example, based on the repeater 205-*c* capability for MT and FWD unit multiplexing, CLI measurements may be performed on indicated resources provided by the configuration information. At 515, the network entity 105-*c*, repeater 205-*c*, and the UE 115-*d* (and optionally one or more other UEs) may perform uplink and downlink transmissions. Such uplink and downlink transmissions may be data and control information transmissions, may be reference signal transmissions, or any combinations thereof. At 520, the repeater 205-*c* may measure CLI based on the uplink and downlink transmissions. For example, RSSI and/or RSRP measurements may be obtained at the repeater 205-*c*.

At 525, the repeater 205-*c* may determine one or more full-duplex parameters for subsequent communications. At 530, the repeater 205-*c* may transmit, and the network entity 105-*c* may receive, assistance information that may indicate supported full-duplex parameters. The assistance information may be based on the determined full-duplex parameters at the repeater 205-*c*, for example. At 535, the network entity 105-*c* may transmit, and the repeater 205-*c* may receive, full-duplex configuration information. For example, the full-duplex configuration information may indicate one or more uplink sub-bands and downlink sub-bands are configured for SBFD communications, based on repeater 205-*c* indication of filtering capability of different sub-bands, one or more CLI measurements, or any combinations thereof. At 540, the network entity 105-*c*, repeater 205-*c*, and UE 115-*d* may engage in full-duplex communications in which uplink and downlink communications to and from the UE 115-*d* are repeated by repeater 205-*c*, in accordance with the full-duplex configuration.

Figure 6:
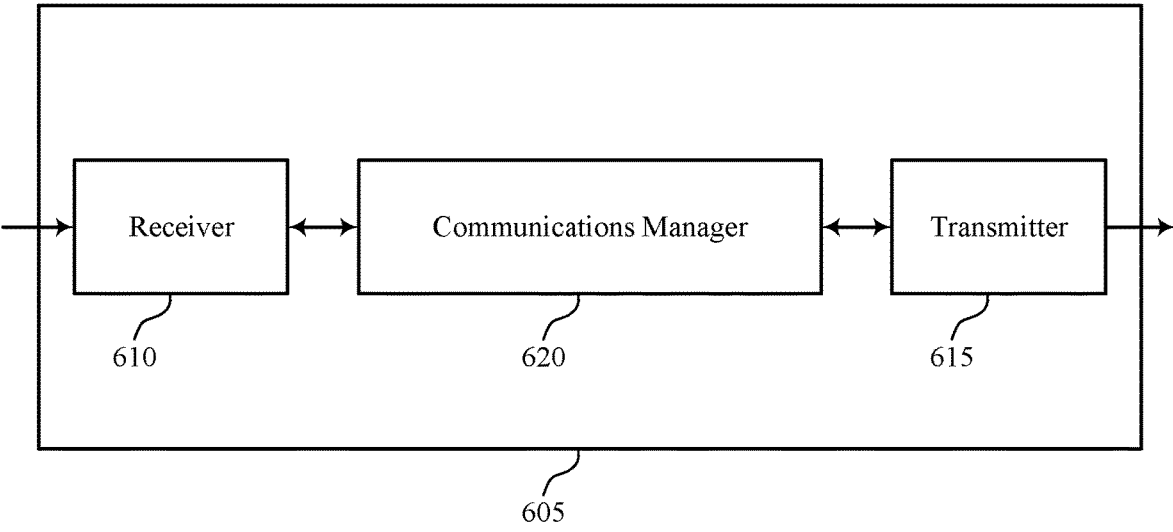
FIGS. 6 and 7 show block diagrams of devices that support techniques for full-duplex operation at repeater nodes in accordance with one or more aspects of the present disclosure.

FIG. 6 shows a block diagram 600 of a device 605 that supports techniques for full-duplex operation at repeater nodes in accordance with one or more aspects of the present disclosure. The device 605 may be an example of aspects of a repeater node 205 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for full-duplex operation at repeater nodes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for full-duplex operation at repeater nodes). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of techniques for full-duplex operation at repeater nodes as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for transmitting, to a network node, a set of full-duplex parameters for full-duplex communications that are supported at the repeater node. The communications manager 620 is capable of, configured to, or operable to support a means for receiving, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node. The communications manager 620 is capable of, configured to, or operable to support a means for relaying communications between the network node, the first UE, and the second UE based on the full-duplex configuration.

By including or configuring the communications manager 620 in accordance with examples as described herein, the device 605 (e.g., at least one processor controlling or otherwise coupled with the receiver 610, the transmitter 615, the communications manager 620, or a combination thereof)

may support techniques to provide for indication of full-duplex capabilities at repeater nodes, which may help enhance network efficiency and throughput. Further, relaying of full-duplex communications may generate additional CLI and SI for the communications, and techniques to manage such interference may help to mitigate impact of such interference on communications, and enhance reliability and throughout.

Figure 7:
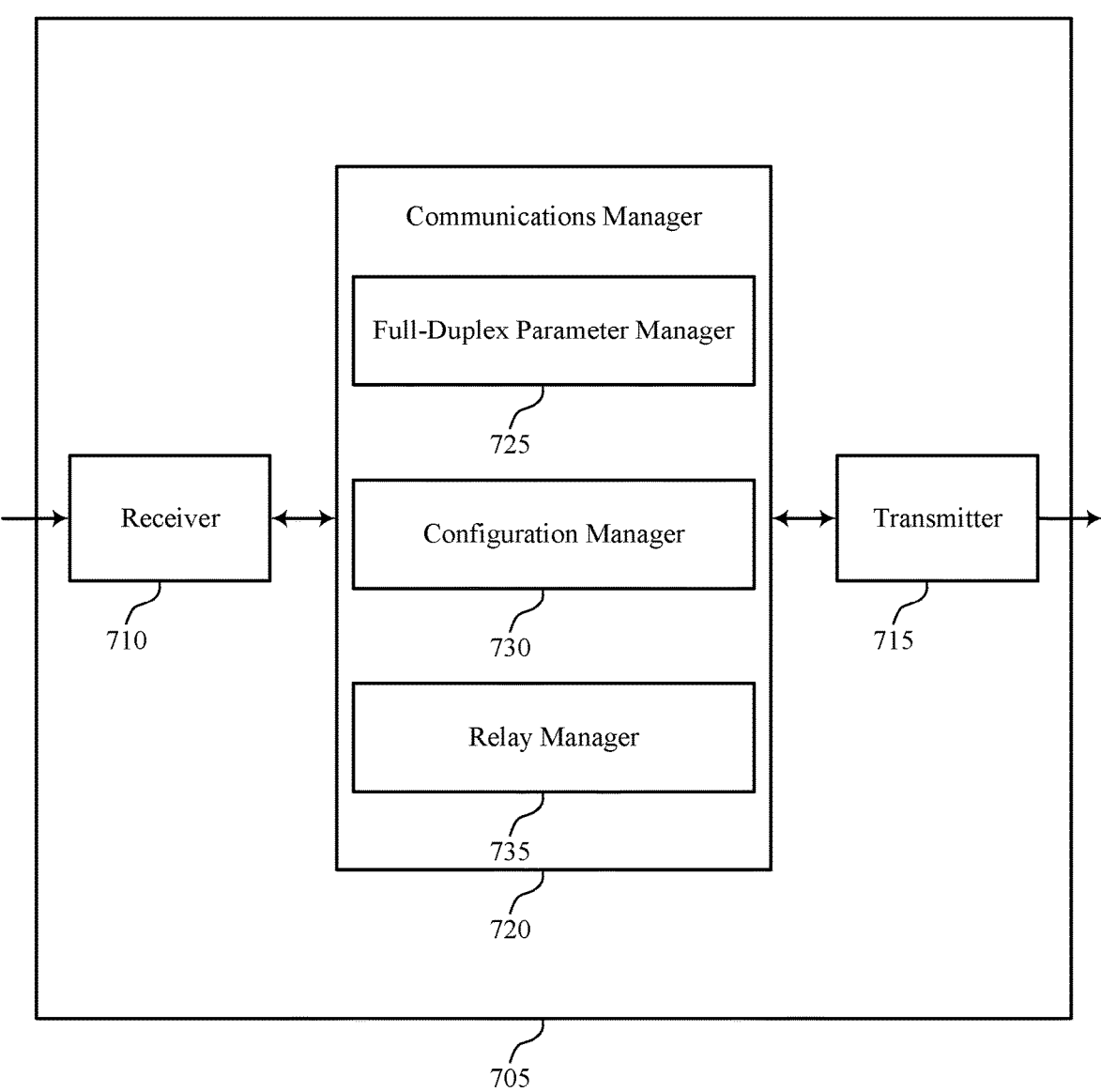

FIG. 7 shows a block diagram 700 of a device 705 that supports techniques for full-duplex operation at repeater nodes in accordance with one or more aspects of the present disclosure. The device 705 may be an example of aspects of a device 605 or a repeater 205 as described herein. The device 705 may include a receiver 710, a transmitter 715, and a communications manager 720. The device 705, or one of more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for full-duplex operation at repeater nodes). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for full-duplex operation at repeater nodes). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for full-duplex operation at repeater nodes as described herein. For example, the communications manager 720 may include a full-duplex parameter manager 725, a configuration manager 730, a relay manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The full-duplex parameter manager 725 is capable of, configured to, or operable to support a means for transmitting, to a network node, a set of full-duplex parameters for full-duplex communications that are supported at the repeater node. The configuration manager 730 is capable of, configured to, or operable to support a means for receiving, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node. The relay manager 735 is capable of, configured to, or operable to support a means for relaying communications between the network node, the first UE, and the second UE based on the full-duplex configuration.

Figure 8:
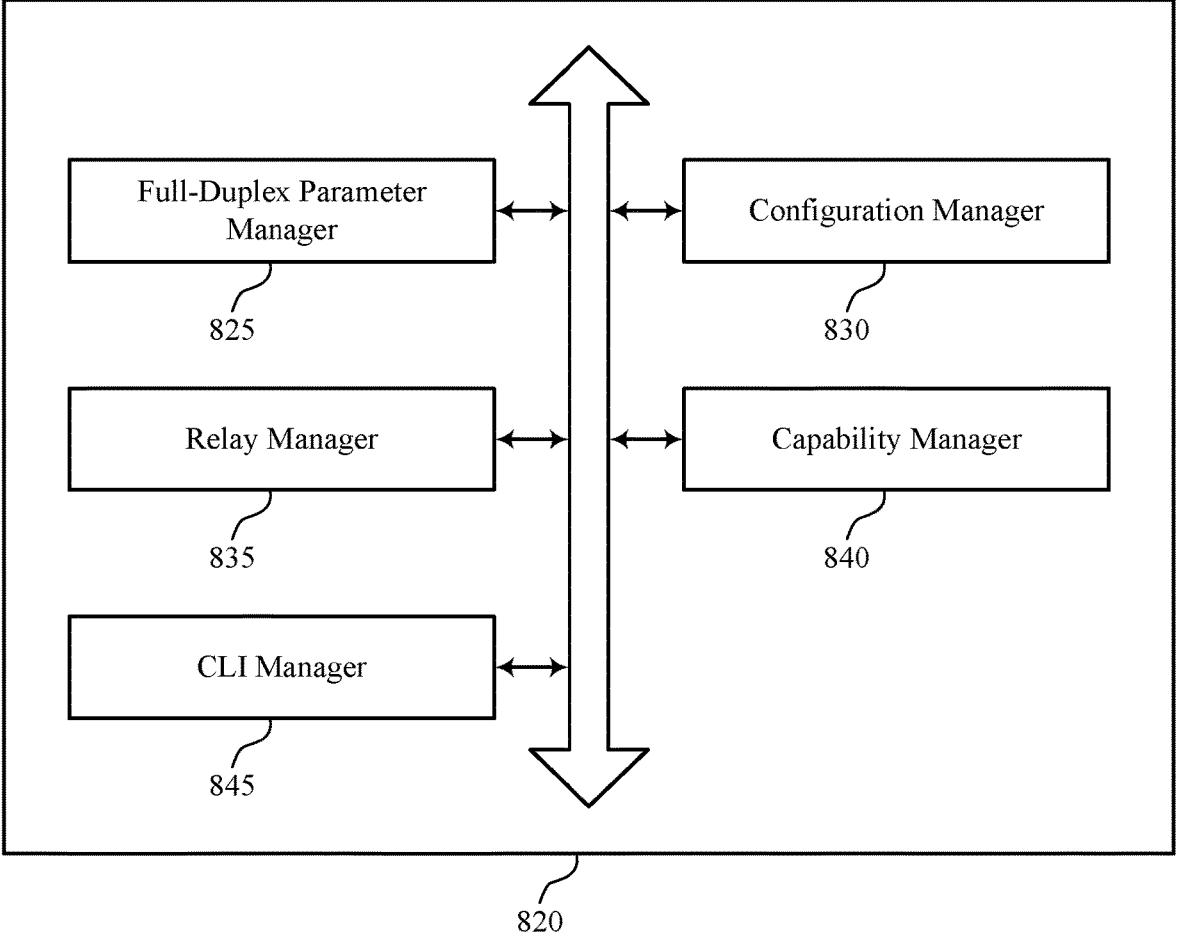
FIG. 8 shows a block diagram of a communications manager that supports techniques for full-duplex operation at repeater nodes in accordance with one or more aspects of the present disclosure.

FIG. 8 shows a block diagram 800 of a communications manager 820 that supports techniques for full-duplex operation at repeater nodes in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for full-duplex operation at repeater nodes as described herein. For example, the communications manager 820 may include a full-duplex parameter manager 825, a configuration manager 830, a relay manager 835, a capability manager 840, a CLI manager 845, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The full-duplex parameter manager 825 is capable of, configured to, or operable to support a means for transmitting, to a network node, a set of full-duplex parameters for full-duplex communications that are supported at the repeater node. The configuration manager 830 is capable of, configured to, or operable to support a means for receiving, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node. The relay manager 835 is capable of, configured to, or operable to support a means for relaying communications between the network node, the first UE, and the second UE based on the full-duplex configuration.

In some examples, the set of full-duplex parameters indicate a filtering capability or a filtering response characteristic of the repeater node. In some examples, the set of full-duplex parameters indicate one or more of a set of sub-bands the repeater node can filter, a width of a pass-band or a transition-band the repeater node can filter, a level of rejection in the transition-band or a stop-band, or any combinations thereof. In some examples, the set of full-duplex parameters indicate an amount of guard-band resources requested between sub-bands of a sub-band full-duplex configuration. In some examples, the amount of guard-band resources is indicated for one or more beams or one or more transmit power levels. In some examples, the set of full-duplex parameters indicate a requested configuration for uplink and downlink sub-bands of a sub-band full-duplex configuration. In some examples, the set of full-duplex parameters indicate a transmission power level or amplification level for one or more of uplink communications, downlink communications, one or more sub-bands, or any combinations thereof. In some examples, the set of full-duplex parameters indicate whether the repeater node can maintain phase-continuity across time-division duplex symbols and sub-band full-duplex symbols. In some examples, the set of full-duplex parameters indicate a requested transition time between time-division duplex symbols and sub-band full-duplex symbols.

In some examples, to support transmitting the set of full-duplex parameters, the configuration manager 830 is capable of, configured to, or operable to support a means for transmitting an indication that the repeater node supports multiplexing between mobile terminal unit (MT) communications and forward unit (FWD) communications, and one or more cross-link interference measurements associated with the MT communications and the FWD communications. In some examples, the indication that the repeater node supports multiplexing between MT communications and FWD communications indicates support for one or more of TDD multiplexing of MT communications contemporaneously with wide-band TDD multiplexing of FWD communications, TDD multiplexing of MT communications contemporaneously with sub-band TDD multiplexing of FWD communications, or TDD multiplexing of MT communications contemporaneously with SBFD multiplexing of FWD communications.

In some examples, the capability manager 840 is capable of, configured to, or operable to support a means for transmitting, to the network node, a capability message that indicates full-duplex modes and configurations that are supported at the repeater node. In some examples, the set of full-duplex parameters are provided based on the full-duplex modes and configuration supported at the repeater node.

In some examples, the CLI manager 845 is capable of, configured to, or operable to support a means for receiving a CLI measurement configuration for reporting of CLI measurements when full-duplex configuration is active. In some examples, the CLI measurement configuration indicates different sets of CLI measurements are to be reported based for two or more different full-duplex configurations.

In some examples, the CLI manager 845 is capable of, configured to, or operable to support a means for measuring CLI for each of the two or more different full-duplex configurations to obtain a set of CLI measurements. In some examples, the CLI manager 845 is capable of, configured to, or operable to support a means for determining the set of full-duplex parameters based on the set of CLI measurements.

In some examples, the different sets of CLI measurements are based on a capability of a MT at the repeater node and a mode of operation of a forward unit at the repeater node. In some examples, the CLI measurements include one or more of RSSI measurements for one or more downlink sub-bands, RSRP measurements for one or more uplink sub-bands, RSSI measurements for one or more uplink sub-bands, separate measurement for non-contiguous downlink sub-bands, or any combinations thereof. In some examples, the CLI measurement configuration indicates a MT at the repeater node is to transmit an uplink reference signal while a forward unit at the repeater node transmits downlink signals in wide-band or one or more sub-bands.

In some examples, the full-duplex configuration includes one or more of a beam indication, power configuration, timing configuration, or any combinations thereof, for one or more sub-bands, group of sub-bands, beam directions, or any combinations thereof.

Figure 9:
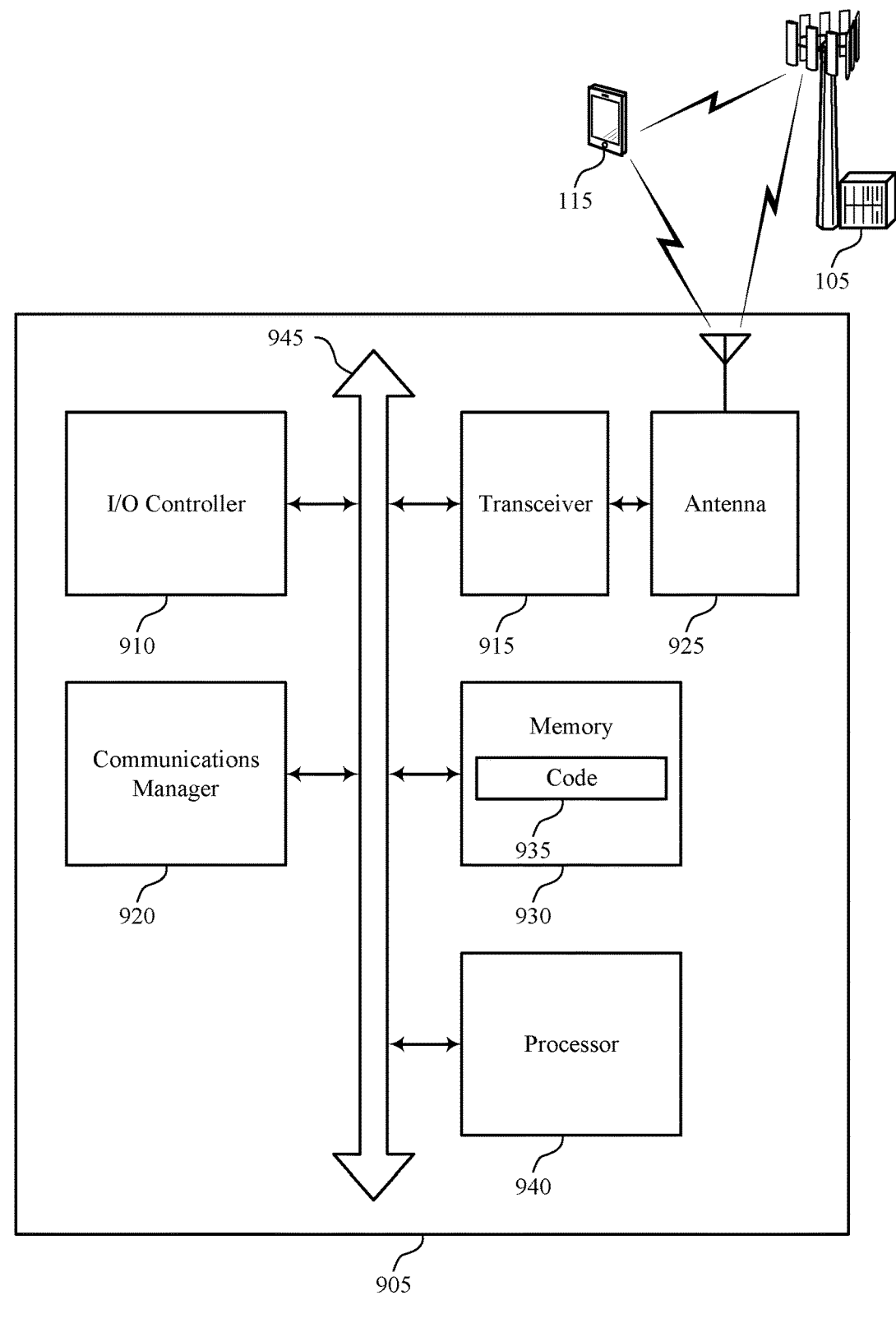
FIG. 9 shows a diagram of a system including a device that supports techniques for full-duplex operation at repeater nodes in accordance with one or more aspects of the present disclosure.

FIG. 9 shows a diagram of a system 900 including a device 905 that supports techniques for full-duplex operation at repeater nodes in accordance with one or more aspects of the present disclosure. The device 905 may be an example of or include components of a device 605, a device 705, or a repeater 205 as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting techniques for full-duplex operation at repeater nodes). For example, the device 905 or a component of the device 905 may include at least one processor 940 and at least one memory 930 coupled with or to the at least one processor 940, the at least one processor 940 and the at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for transmitting, to a network node, a set of full-duplex parameters for full-duplex communications that are supported at the repeater node. The communications manager 920 is capable of, configured to, or operable to support a means for receiving, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node. The communications manager 920 is capable of, configured to, or operable to support a means for relaying communications between the network node, the first UE, and the second UE based on the full-duplex configuration.

By including or configuring the communications manager 920 in accordance with examples as described herein, the device 905 may support techniques to provide for indication of full-duplex capabilities at repeater nodes, which may help enhance network efficiency and throughput. Further, relaying of full-duplex communications may generate additional CLI and SI for the communications, and techniques to manage such interference may help to mitigate impact of such interference on communications, and enhance reliability and throughout.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of techniques for full-duplex operation at repeater nodes as described herein, or the at least one processor 940 and the at least one memory 930 may be otherwise configured to, individually or collectively, perform or support such operations.

Figure 10:
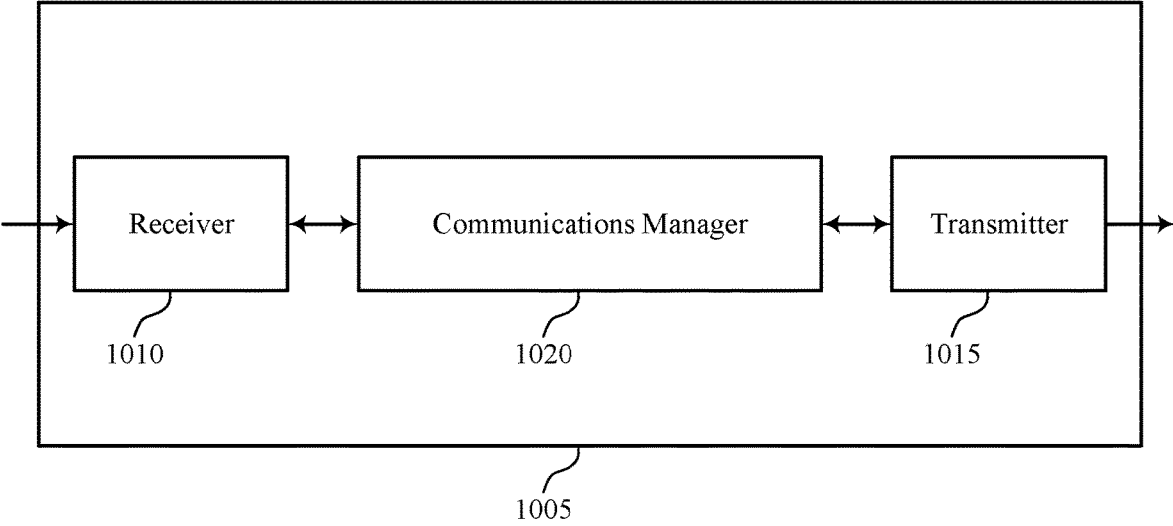
FIGS. 10 and 11 show block diagrams of devices that support techniques for full-duplex operation at repeater nodes in accordance with one or more aspects of the present disclosure.

FIG. 10 shows a block diagram 1000 of a device 1005 that supports techniques for full-duplex operation at repeater nodes in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter

1015 and the receiver 1010 may be co-located in a transceiver, which may include or be coupled with a modem.

The communications manager 1020, the receiver 1010, the transmitter 1015, or various combinations or components thereof may be examples of means for performing various aspects of techniques for full-duplex operation at repeater nodes as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for obtaining a set of full-duplex parameters for full-duplex communications that are supported at a repeater node. The communications manager 1020 is capable of, configured to, or operable to support a means for outputting a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node. The communications manager 1020 is capable of, configured to, or operable to support a means for communicating with the first UE and the second UE via the repeater node based on the full-duplex configuration.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques to provide for indication of full-duplex capabilities at repeater nodes, which may help enhance network efficiency and throughput. Further, relaying of full-duplex communications may generate additional CLI and SI for the communications, and techniques to manage such interference may help to mitigate impact of such interference on communications, and enhance reliability and throughout.

Figure 11:
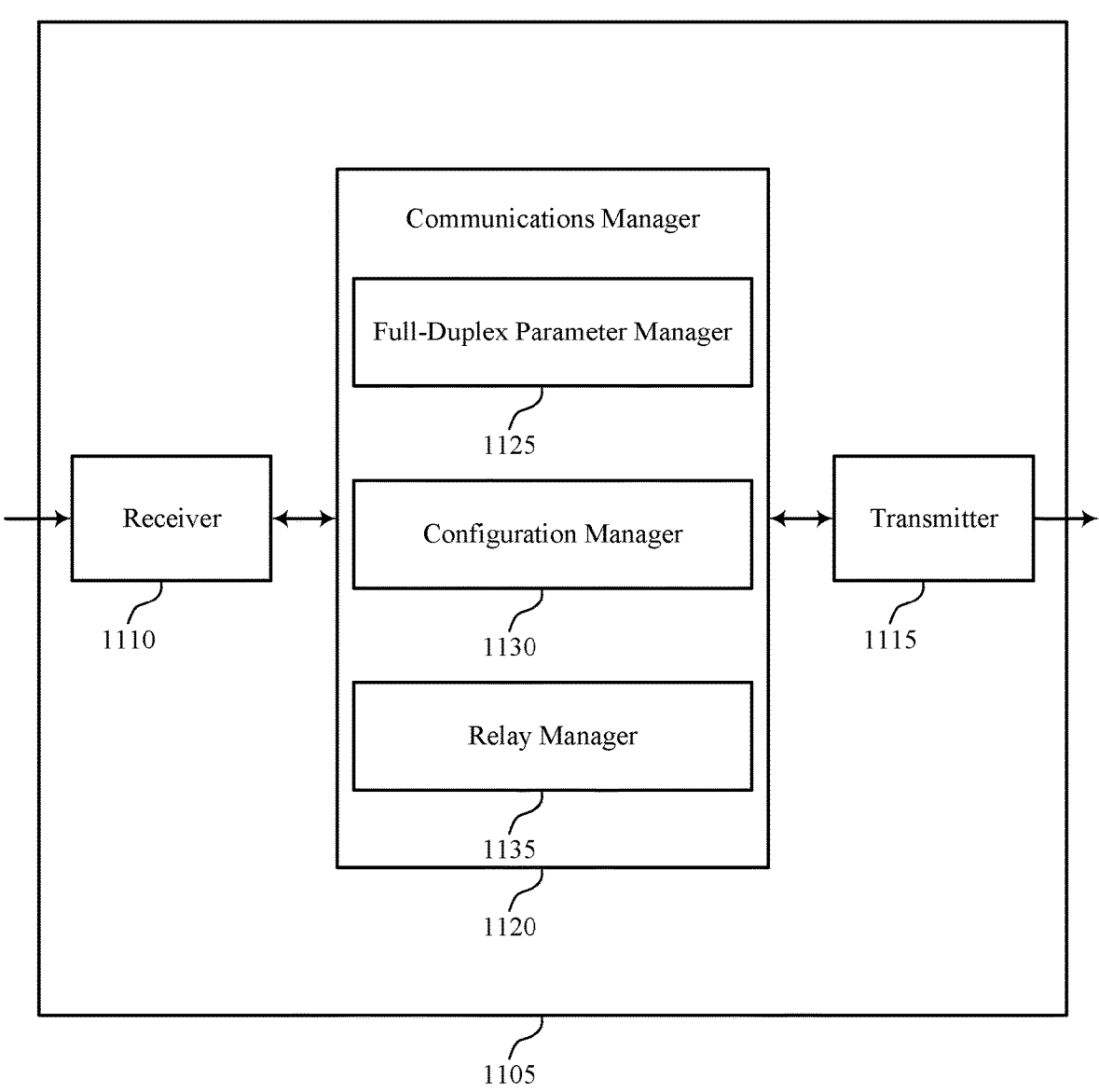

FIG. 11 shows a block diagram 1100 of a device 1105 that supports techniques for full-duplex operation at repeater nodes in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one of more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for full-duplex operation at repeater nodes as described herein. For example, the communications manager 1120 may include a full-duplex parameter manager

1125, a configuration manager 1130, a relay manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The full-duplex parameter manager 1125 is capable of, configured to, or operable to support a means for obtaining a set of full-duplex parameters for full-duplex communications that are supported at a repeater node. The configuration manager 1130 is capable of, configured to, or operable to support a means for outputting a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node. The relay manager 1135 is capable of, configured to, or operable to support a means for communicating with the first UE and the second UE via the repeater node based on the full-duplex configuration.

Figure 12:
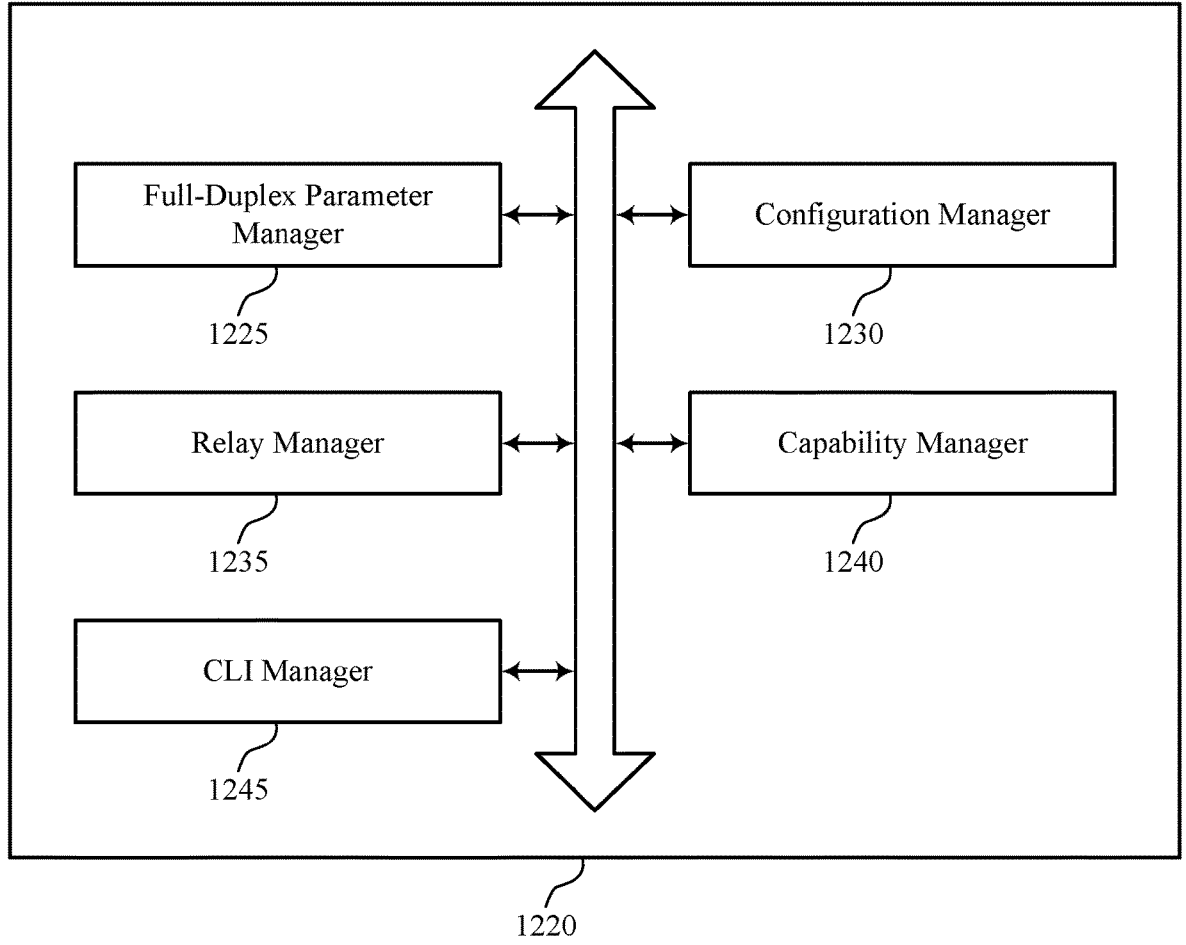
FIG. 12 shows a block diagram of a communications manager that supports techniques for full-duplex operation at repeater nodes in accordance with one or more aspects of the present disclosure.

FIG. 12 shows a block diagram 1200 of a communications manager 1220 that supports techniques for full-duplex operation at repeater nodes in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for full-duplex operation at repeater nodes as described herein. For example, the communications manager 1220 may include a full-duplex parameter manager 1225, a configuration manager 1230, a relay manager 1235, a capability manager 1240, a CLI manager 1245, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The full-duplex parameter manager 1225 is capable of, configured to, or operable to support a means for obtaining a set of full-duplex parameters for full-duplex communications that are supported at a repeater node. The configuration manager 1230 is capable of, configured to, or operable to support a means for outputting a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node. The relay manager 1235 is capable of, configured to, or operable to support a means for communicating with the first UE and the second UE via the repeater node based on the full-duplex configuration.

In some examples, the set of full-duplex parameters indicate a filtering capability or a filtering response characteristic of the repeater node. In some examples, the set of full-duplex parameters indicate one or more of a set of sub-bands the repeater node can filter, a width of a pass-band or a transition-band the repeater node can filter, a level of rejection in the transition-band or a stop-band, or any combinations thereof. In some examples, the set of full-duplex parameters indicate an amount of guard-band resources requested between sub-bands of a sub-band full-duplex configuration. In some examples, the amount of guard-band resources is indicated for one or more beams or one or more transmit power levels. In some examples, the set of full-duplex parameters indicate a requested configuration for uplink and downlink sub-bands of a sub-band full-duplex configuration. In some examples, the set of full-duplex parameters indicate a transmission power level or amplification level for one or more of uplink communications, downlink communications, one or more sub-bands, or any combinations thereof. In some examples, the set of full-duplex parameters indicate whether the repeater node can maintain phase-continuity across time-division duplex symbols and sub-band full-duplex symbols. In some examples, the set of full-duplex parameters indicate a requested transition time between time-division duplex symbols and sub-band full-duplex symbols.

In some examples, to support obtaining the set of full-duplex parameters, the configuration manager 1230 is capable of, configured to, or operable to support a means for obtaining an indication that the repeater node supports multiplexing between MT communications and FWD communications, and one or more cross-link interference measurements associated with the MT communications and the FWD communications. In some examples, the indication that the repeater node supports multiplexing between MT communications and FWD communications indicates support for one or more of TDD multiplexing of MT communications contemporaneously with wide-band TDD multiplexing of FWD communications, TDD multiplexing of MT communications contemporaneously with sub-band TDD multiplexing of FWD communications, or TDD multiplexing of MT communications contemporaneously with SBFD multiplexing of FWD communications.

In some examples, the capability manager 1240 is capable of, configured to, or operable to support a means for obtaining a capability message that indicates full-duplex modes and configurations that are supported at the repeater node. In some examples, the set of full-duplex parameters are provided based on the full-duplex modes and configuration supported at the repeater node.

In some examples, the CLI manager 1245 is capable of, configured to, or operable to support a means for outputting a CLI measurement configuration for reporting of CLI measurements by the repeater node when full-duplex configuration is active. In some examples, the CLI measurement configuration indicates different sets of CLI measurements are to be reported based for two or more different full-duplex configurations. In some examples, the different sets of CLI measurements are based on a capability of a mobile terminal unit at the repeater node and a mode of operation of a forward unit at the repeater node. In some examples, the CLI measurements include one or more of RSSI measurements for one or more downlink sub-bands, RSRP measurements for one or more uplink sub-bands, RSSI measurements for one or more uplink sub-bands, separate measurement for non-contiguous downlink sub-bands, or any combinations thereof. In some examples, the CLI measurement configuration indicates a mobile terminal unit at the repeater node is to transmit an uplink reference signal while a forward unit at the repeater node transmits downlink signals in wide-band or one or more sub-bands.

In some examples, the full-duplex configuration includes one or more of a beam indication, power configuration, timing configuration, or any combinations thereof, for one or more sub-bands, group of sub-bands, beam directions, or any combinations thereof.

Figure 13:
FIG. 13 shows a diagram of a system including a device that supports techniques for full-duplex operation at repeater nodes in accordance with one or more aspects of the present disclosure.

FIG. 13 shows a diagram of a system 1300 including a device 1305 that supports techniques for full-duplex operation at repeater nodes in accordance with one or more aspects of the present disclosure. The device 1305 may be an example of or include components of a device 1005, a device 1105, or a network entity 105 as described herein. The device 1305 may communicate with other network devices or network equipment such as one or more of the network entities 105, UEs 115, or any combination thereof. The communications may include communications over one or more wired interfaces, over one or more wireless interfaces, or any combination thereof. The device 1305 may include components that support outputting and obtaining communications, such as a communications manager 1320, a transceiver 1310, one or more antennas 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., communication link(s) 125, backhaul communication link(s) 120, a midhaul communication link 162, a fronthaul communication link 168).

The at least one memory 1325 may include RAM, ROM, or any combination thereof. The at least one memory 1325 may store computer-readable, computer-executable, or processor-executable code, such as the code 1330. The code 1330 may include instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may include, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting techniques for full-duplex operation at repeater nodes). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with one or more other network devices 105, and may include a controller or scheduler for controlling communications with UEs 115 (e.g., in cooperation with the one or more other network devices). In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for obtaining a set of full-duplex parameters for full-duplex communications that are supported at a repeater node. The communications manager 1320 is capable of, configured to, or operable to support a means for outputting a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node. The communications manager 1320 is capable of, configured to, or operable to support a means for communicating with the first UE and the second UE via the repeater node based on the full-duplex configuration.

By including or configuring the communications manager 1320 in accordance with examples as described herein, the device 1305 may support techniques to provide for indication of full-duplex capabilities at repeater nodes, which may help enhance network efficiency and throughput. Further, relaying of full-duplex communications may generate additional CLI and SI for the communications, and techniques to manage such interference may help to mitigate impact of such interference on communications, and enhance reliability and throughout.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of techniques for full-duplex operation at repeater nodes as described herein, or the at least one processor 1335 and the at least one memory 1325 may be otherwise configured to, individually or collectively, perform or support such operations.

FIG. 14 shows a flowchart illustrating a method 1400 that supports techniques for full-duplex operation at repeater nodes in accordance with one or more aspects of the present disclosure. The operations of the method 1400 may be implemented by a repeater or its components as described herein. For example, the operations of the method 1400 may be performed by a repeater 205 as described with reference to FIGS. 1 through 9. In some examples, a repeater may execute a set of instructions to control the functional elements of the repeater to perform the described functions. Additionally, or alternatively, the repeater may perform aspects of the described functions using special-purpose hardware.

Optionally, at 1405, the method may include transmitting, to a network node, a capability message that indicates full-duplex modes and configurations that are supported at the repeater node. The operations of 1405 may be performed in accordance with examples as disclosed herein. In some examples, aspects of the operations of 1405 may be performed by a capability manager 840 as described with reference to FIG. 8.

At 1410, the method may include transmitting, to the network node, a set of full-duplex parameters for full-duplex communications that are supported at the repeater node. The operations of 1410 may be performed in accordance with examples as disclosed herein. In some examples, aspects of the operations of 1410 may be performed by a full-duplex parameter manager 825 as described with reference to FIG. 8.

At 1415, the method may include receiving, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node. The operations of 1415 may be performed in accordance with examples as disclosed herein. In some examples, aspects of the operations of 1415 may be performed by a configuration manager 830 as described with reference to FIG. 8.

At 1420, the method may include relaying communications between the network node, the first UE, and the second UE based on the full-duplex configuration. The operations of 1420 may be performed in accordance with examples as disclosed herein. In some examples, aspects of the operations of 1420 may be performed by a relay manager 835 as described with reference to FIG. 8.

FIG. 15 shows a flowchart illustrating a method 1500 that supports techniques for full-duplex operation at repeater nodes in accordance with one or more aspects of the present disclosure. The operations of the method 1500 may be implemented by a repeater or its components as described herein. For example, the operations of the method 1500 may be performed by a repeater 205 as described with reference to FIGS. 1 through 9. In some examples, a repeater may execute a set of instructions to control the functional elements of the repeater to perform the described functions. Additionally, or alternatively, the repeater may perform aspects of the described functions using special-purpose hardware.

At 1505, the method may include transmitting, to a network node, a set of full-duplex parameters for full-duplex communications that are supported at the repeater node. The operations of 1505 may be performed in accordance with examples as disclosed herein. In some examples, aspects of the operations of 1505 may be performed by a full-duplex parameter manager 825 as described with reference to FIG. 8.

At 1510, the method may include transmitting an indication that the repeater node supports multiplexing between MT communications and FWD communications, and one or more cross-link interference measurements associated with the MT communications and the FWD communications. The operations of 1510 may be performed in accordance with examples as disclosed herein. In some examples, aspects of the operations of 1510 may be performed by a configuration manager 830 as described with reference to FIG. 8.

At 1515, the method may include receiving, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node. The operations of 1515 may be performed in accordance with examples as disclosed herein. In some examples, aspects of the operations of 1515 may be performed by a configuration manager 830 as described with reference to FIG. 8.

At 1520, the method may include relaying communications between the network node, the first UE, and the second UE based on the full-duplex configuration. The operations of 1520 may be performed in accordance with examples as disclosed herein. In some examples, aspects of the operations of 1520 may be performed by a relay manager 835 as described with reference to FIG. 8.

FIG. 16 shows a flowchart illustrating a method 1600 that supports techniques for full-duplex operation at repeater nodes in accordance with one or more aspects of the present disclosure. The operations of the method 1600 may be implemented by a repeater or its components as described herein. For example, the operations of the method 1600 may be performed by a repeater 205 as described with reference to FIGS. 1 through 9. In some examples, a repeater may execute a set of instructions to control the functional elements of the repeater to perform the described functions. Additionally, or alternatively, the repeater may perform aspects of the described functions using special-purpose hardware.

At 1605, the method may include transmitting, to a network node, a set of full-duplex parameters for full-duplex communications that are supported at the repeater node. The operations of 1605 may be performed in accordance with examples as disclosed herein. In some examples, aspects of the operations of 1605 may be performed by a full-duplex parameter manager 825 as described with reference to FIG. 8.

At 1610, the method may include receiving, from the network node, a full-duplex configuration for communications between the network node and at least a first UE and a second UE, where the full-duplex configuration provides for downlink communications from the network node that are forwarded to the first UE contemporaneously with uplink communications that are forwarded from the second UE to the network node. The operations of 1610 may be performed in accordance with examples as disclosed herein. In some examples, aspects of the operations of 1610 may be performed by a configuration manager 830 as described with reference to FIG. 8.

At 1615, the method may include receiving a cross-link interference (CLI) measurement configuration for reporting of CLI measurements when full-duplex configuration is active. The operations of 1615 may be performed in accordance with examples as disclosed herein. In some examples, aspects of the operations of 1615 may be performed by a CLI manager 845 as described with reference to FIG. 8. In some cases, the CLI measurement configuration may indicate different sets of CLI measurements are to be reported based for two or more different full-duplex configurations.

At 1620, the method may include measuring CLI for each of the two or more different full-duplex configurations to obtain a set of CLI measurements. The operations of 1620 may be performed in accordance with examples as disclosed herein. In some examples, aspects of the operations of 1620 may be performed by a CLI manager 845 as described with reference to FIG. 8.

At 1625, the method may include determining the set of full-duplex parameters based on the set of CLI measurements. The operations of 1625 may be performed in accordance with examples as disclosed herein. In some examples, aspects of the operations of 1625 may be performed by a CLI manager 845 as described with reference to FIG. 8.

At 1630, the method may include relaying communications between the network node, the first UE, and the second UE based on the full-duplex configuration. The operations of 1630 may be performed in accordance with examples as disclosed herein. In some examples, aspects of the operations of 1630 may be performed by a relay manager 835 as described with reference to FIG. 8.

FIG. 17 shows a flowchart illustrating a method 1700 that supports techniques for full-duplex operation at repeater nodes in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

Optionally, at 1705, the method may include obtaining a capability message that indicates full-duplex modes and configurations that are supported at a repeater node. The operations of 1705 may be performed in accordance with examples as disclosed herein. In some examples, aspects of the operations of 1705 may be performed by a capability manager 1240 as described with reference to FIG. 12.

At 1710, the method may include obtaining a set of full-duplex parameters for full-duplex communications that are supported at the repeater node. The operations of 1710 may be performed in accordance with examples as disclosed herein. In some examples, aspects of the operations of 1710 may be performed by a full-duplex parameter manager 1225 as described with reference to FIG. 12.

At 1715, the method may include outputting a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node. The operations of 1715 may be performed in accordance with examples as disclosed herein. In some examples, aspects of the operations of 1715 may be performed by a configuration manager 1230 as described with reference to FIG. 12.

At 1720, the method may include communicating with the first UE and the second UE via the repeater node based on the full-duplex configuration. The operations of 1720 may be performed in accordance with examples as disclosed herein. In some examples, aspects of the operations of 1720 may be performed by a relay manager 1235 as described with reference to FIG. 12.

FIG. 18 shows a flowchart illustrating a method 1800 that supports techniques for full-duplex operation at repeater nodes in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include obtaining a set of full-duplex parameters for full-duplex communications that are supported at a repeater node. The operations of 1805 may be performed in accordance with examples as disclosed herein. In some examples, aspects of the operations of 1805 may be performed by a full-duplex parameter manager 1225 as described with reference to FIG. 12.

At 1810, the method may include outputting a full-duplex configuration for communications between the network node and at least a first UE and a second UE, where the full-duplex configuration provides for downlink communications from the network node that are forwarded by the repeater node to the first UE contemporaneously with uplink communications that are forwarded from the second UE by the repeater node to the network node. The operations of 1810 may be performed in accordance with examples as disclosed herein. In some examples, aspects of the operations of 1810 may be performed by a configuration manager 1230 as described with reference to FIG. 12.

At 1815, the method may include outputting a CLI measurement configuration for reporting of CLI measurements by the repeater node when full-duplex configuration is active. The operations of 1815 may be performed in accordance with examples as disclosed herein. In some examples, aspects of the operations of 1815 may be performed by a CLI manager 1245 as described with reference to FIG. 12.

At 1820, the method may include communicating with the first UE and the second UE via the repeater node based on the full-duplex configuration. The operations of 1820 may be performed in accordance with examples as disclosed herein. In some examples, aspects of the operations of 1820 may be performed by a relay manager 1235 as described with reference to FIG. 12.

The following provides an overview of aspects of the present disclosure:

Aspect 1: A method for wireless communications at a repeater node, comprising: transmitting, to a network node, a set of full-duplex parameters for full-duplex communications that are supported at the repeater node; receiving, from the network node, a full-duplex configuration for communications between the network node and at least a first UE and a second UE, wherein the full-duplex configuration provides for downlink communications from the network node that are forwarded to the first UE contemporaneously with uplink communications that are forwarded from the second UE to the network node; and relaying communications between the network node, the first UE, and the second UE based at least in part on the full-duplex configuration.

Aspect 2: The method of aspect 1, wherein the set of full-duplex parameters indicate a filtering capability or a filtering response characteristic of the repeater node.

Aspect 3: The method of any of aspects 1 through 2, wherein the set of full-duplex parameters indicate one or more of a set of sub-bands the repeater node can filter, a width of a pass-band or a transition-band the repeater node can filter, a level of rejection in the transition-band or a stop-band, or any combinations thereof.

Aspect 4: The method of any of aspects 1 through 3, wherein the set of full-duplex parameters indicate an amount of guard-band resources requested between sub-bands of a sub-band full-duplex configuration.

Aspect 5: The method of aspect 4, wherein the amount of guard-band resources is indicated for one or more beams or one or more transmit power levels.

Aspect 6: The method of any of aspects 1 through 5, wherein the set of full-duplex parameters indicate a requested configuration for uplink and downlink sub-bands of a sub-band full-duplex configuration.

Aspect 7: The method of any of aspects 1 through 6, wherein the set of full-duplex parameters indicate a transmission power level or amplification level for one or more of uplink communications, downlink communications, one or more sub-bands, or any combinations thereof.

Aspect 8: The method of any of aspects 1 through 7, wherein the set of full-duplex parameters indicate whether the repeater node can maintain phase-continuity across time-division duplex symbols and sub-band full-duplex symbols.

Aspect 9: The method of any of aspects 1 through 8, wherein the set of full-duplex parameters indicate a requested transition time between time-division duplex symbols and sub-band full-duplex symbols.

Aspect 10: The method of any of aspects 1 through 9, wherein the transmitting the set of full-duplex parameters further comprises: transmitting an indication that the repeater node supports multiplexing between MT communications and FWD communications, and one or more cross-link interference measurements associated with the MT communications and the FWD communications.

Aspect 11: The method of aspect 10, wherein the indication that the repeater node supports multiplexing between MT communications and FWD communications indicates support for one or more of TDD multiplexing of MT communications contemporaneously with wide-band TDD multiplexing of FWD communications, TDD multiplexing of MT communications contemporaneously with sub-band TDD multiplexing of FWD communications, or TDD multiplexing of MT communications contemporaneously with SBFD multiplexing of FWD communications.

Aspect 12: The method of any of aspects 1 through 11, further comprising: transmitting, to the network node, a capability message that indicates full-duplex modes and configurations that are supported at the repeater node.

Aspect 13: The method of aspect 12, wherein the set of full-duplex parameters are provided based at least in part on the full-duplex modes and configuration supported at the repeater node.

Aspect 14: The method of any of aspects 1 through 13, further comprising: receiving a CLI measurement configuration for reporting of CLI measurements when full-duplex configuration is active.

Aspect 15: The method of aspect 14, wherein the CLI measurement configuration indicates different sets of CLI measurements are to be reported based for two or more different full-duplex configurations.

Aspect 16: The method of aspect 15, further comprising: measuring CLI for each of the two or more different full-duplex configurations to obtain a set of CLI measurements; and determining the set of full-duplex parameters based at least in part on the set of CLI measurements.

Aspect 17: The method of any of aspects 15 through 16, wherein the different sets of CLI measurements are based at least in part on a capability of a MT at the repeater node and a mode of operation of a forward unit at the repeater node.

Aspect 18: The method of any of aspects 14 through 17, wherein the CLI measurements include one or more of RSSI measurements for one or more downlink sub-bands, RSRP measurements for one or more uplink sub-bands, RSSI measurements for one or more uplink sub-bands, separate measurement for non-contiguous downlink sub-bands, or any combinations thereof.

Aspect 19: The method of any of aspects 14 through 18, wherein the CLI measurement configuration indicates a MT at the repeater node is to transmit an uplink reference signal while a forward unit at the repeater node transmits downlink signals in wide-band or one or more sub-bands.

Aspect 20: The method of any of aspects 1 through 19, wherein the full-duplex configuration includes one or more of a beam indication, power configuration, timing configuration, or any combinations thereof, for one or more sub-bands, group of sub-bands, beam directions, or any combinations thereof.

Aspect 21: A method for wireless communications at a network node, comprising: obtaining a set of full-duplex parameters for full-duplex communications that are supported at a repeater node; outputting a full-duplex configuration for communications between the network node and at least a first UE and a second UE, wherein the full-duplex configuration provides for downlink communications from the network node that are forwarded by the repeater node to the first UE contemporaneously with uplink communications that are forwarded from the second UE by the repeater node to the network node; and communicating with the first UE and the second UE via the repeater node based at least in part on the full-duplex configuration.

Aspect 22: The method of aspect 21, wherein the set of full-duplex parameters indicate a filtering capability or a filtering response characteristic of the repeater node.

Aspect 23: The method of any of aspects 21 through 22, wherein the set of full-duplex parameters indicate one or more of a set of sub-bands the repeater node can filter, a width of a pass-band or a transition-band the repeater node can filter, a level of rejection in the transition-band or a stop-band, or any combinations thereof.

Aspect 24: The method of any of aspects 21 through 23, wherein the set of full-duplex parameters indicate an amount of guard-band resources requested between sub-bands of a sub-band full-duplex configuration.

Aspect 25: The method of aspect 24, wherein the amount of guard-band resources is indicated for one or more beams or one or more transmit power levels.

Aspect 26: The method of any of aspects 21 through 25, wherein the set of full-duplex parameters indicate a requested configuration for uplink and downlink sub-bands of a sub-band full-duplex configuration.

Aspect 27: The method of any of aspects 21 through 26, wherein the set of full-duplex parameters indicate a transmission power level or amplification level for one or more of uplink communications, downlink communications, one or more sub-bands, or any combinations thereof.

Aspect 28: The method of any of aspects 21 through 27, wherein the set of full-duplex parameters indicate whether the repeater node can maintain phase-continuity across time-division duplex symbols and sub-band full-duplex symbols.

Aspect 29: The method of any of aspects 21 through 28, wherein the set of full-duplex parameters indicate a requested transition time between time-division duplex symbols and sub-band full-duplex symbols.

Aspect 30: The method of any of aspects 21 through 29, wherein the obtaining the set of full-duplex parameters further comprises: obtaining an indication that the repeater node supports multiplexing between MT communications and FWD communications, and one or more cross-link interference measurements associated with the MT communications and the FWD communications.

Aspect 31: The method of aspect 30, wherein the indication that the repeater node supports multiplexing between MT communications and FWD communications indicates support for one or more of TDD multiplexing of MT communications contemporaneously with wide-band TDD multiplexing of FWD communications, TDD multiplexing of MT communications contemporaneously with sub-band TDD multiplexing of FWD communications, or TDD multiplexing of MT communications contemporaneously with SBFD multiplexing of FWD communications.

Aspect 32: The method of any of aspects 21 through 31, further comprising: obtaining a capability message that indicates full-duplex modes and configurations that are supported at the repeater node.

Aspect 33: The method of aspect 32, wherein the set of full-duplex parameters are provided based at least in part on the full-duplex modes and configuration supported at the repeater node.

Aspect 34: The method of any of aspects 21 through 33, further comprising: outputting a CLI measurement configuration for reporting of CLI measurements by the repeater node when full-duplex configuration is active.

Aspect 35: The method of aspect 34, wherein the CLI measurement configuration indicates different sets of CLI measurements are to be reported based for two or more different full-duplex configurations.

Aspect 36: The method of aspect 35, wherein the different sets of CLI measurements are based at least in part on a capability of a mobile terminal unit at the repeater node and a mode of operation of a forward unit at the repeater node.

Aspect 37: The method of any of aspects 34 through 36, wherein the CLI measurements include one or more of RSSI measurements for one or more downlink sub-bands, RSRP measurements for one or more uplink sub-bands, RSSI measurements for one or more uplink sub-bands, separate measurement for non-contiguous downlink sub-bands, or any combinations thereof.

Aspect 38: The method of any of aspects 34 through 37, wherein the CLI measurement configuration indicates a mobile terminal unit at the repeater node is to transmit an uplink reference signal while a forward unit at the repeater node transmits downlink signals in wide-band or one or more sub-bands.

Aspect 39: The method of any of aspects 21 through 38, wherein the full-duplex configuration includes one or more of a beam indication, power configuration, timing configuration, or any combinations thereof, for one or more sub-bands, group of sub-bands, beam directions, or any combinations thereof.

Aspect 40: A repeater node for wireless communications, comprising one or more memories storing processor-executable code, and one or more processors coupled with the one or more memories and individually or collectively operable to execute the code to cause the repeater node to perform a method of any of aspects 1 through 20.

Aspect 41: A repeater node for wireless communications, comprising at least one means for performing a method of any of aspects 1 through 20.

Aspect 42: A non-transitory computer-readable medium storing code for wireless communications, the code comprising instructions executable by one or more processors to perform a method of any of aspects 1 through 20.

Aspect 43: A network node for wireless communications, comprising one or more memories storing processor-executable code, and one or more processors coupled with the one or more memories and individually or collectively operable to execute the code to cause the network node to perform a method of any of aspects 21 through 39.

Aspect 44: A network node for wireless communications, comprising at least one means for performing a method of any of aspects 21 through 39.

Aspect 45: A non-transitory computer-readable medium storing code for wireless communications, the code comprising instructions executable by one or more processors to perform a method of any of aspects 21 through 39.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A repeater node, comprising:
one or more memories storing processor-executable code; and
one or more processors coupled with the one or more memories and individually or collectively operable to execute the code to cause the repeater node to:
transmit, to a network node, a set of full-duplex parameters for full-duplex communications that are supported at the repeater node;
receive, from the network node, a full-duplex configuration for communications between the network node and at least a first user equipment (UE) and a second UE, wherein the full-duplex configuration provides for downlink communications from the network node that are forwarded to the first UE contemporaneously with uplink communications that are forwarded from the second UE to the network node; and
relay communications between the network node, the first UE, and the second UE based at least in part on the full-duplex configuration.

2. The repeater node of claim 1, wherein the set of full-duplex parameters indicate a filtering capability or a filtering response characteristic of the repeater node.

3. The repeater node of claim 1, wherein the set of full-duplex parameters indicate one or more of a set of sub-bands the repeater node can filter, a width of a pass-band or a transition-band the repeater node can filter, a level of rejection in the transition-band or a stop-band, or any combinations thereof.

4. The repeater node of claim 1, wherein the set of full-duplex parameters indicate an amount of guard-band resources requested between sub-bands of a sub-band full-duplex configuration.

5. The repeater node of claim 1, wherein the set of full-duplex parameters indicate a requested configuration for uplink and downlink sub-bands of a sub-band full-duplex configuration.

6. The repeater node of claim 1, wherein the set of full-duplex parameters indicate a transmission power level or amplification level for one or more of uplink communications, downlink communications, one or more sub-bands, or any combinations thereof.

7. The repeater node of claim 1, wherein the set of full-duplex parameters indicate whether the repeater node can maintain phase-continuity across time-division duplex symbols and sub-band full-duplex symbols.

8. The repeater node of claim 1, wherein, to transmit the set of full-duplex parameters, the one or more processors are individually or collectively further operable to execute the code to cause the repeater node to:
transmit an indication that the repeater node supports multiplexing between mobile terminal unit (MT) communications and forward unit (FWD) communications, and one or more cross-link interference measurements associated with the MT communications and the FWD communications.

9. The repeater node of claim 1, wherein the one or more processors are individually or collectively further operable to execute the code to cause the repeater node to:
receive a cross-link interference (CLI) measurement configuration for reporting of CLI measurements when full-duplex configuration is active.

10. The repeater node of claim 9, wherein:
the CLI measurement configuration indicates different sets of CLI measurements are to be reported based for two or more different full-duplex configurations.

11. The repeater node of claim 10, wherein the one or more processors are individually or collectively further operable to execute the code to cause the repeater node to:
measure CLI for each of the two or more different full-duplex configurations to obtain a set of CLI measurements; and
determine the set of full-duplex parameters based at least in part on the set of CLI measurements.

12. A network node, comprising:
one or more memories storing processor-executable code; and
one or more processors coupled with the one or more memories and individually or collectively operable to execute the code to cause the network node to:
obtain a set of full-duplex parameters for full-duplex communications that are supported at a repeater node;
output a full-duplex configuration for communications between the network node and at least a first user equipment (UE) and a second UE, wherein the full-duplex configuration provides for downlink communications from the network node that are forwarded by the repeater node to the first UE contemporaneously with uplink communications that are forwarded from the second UE by the repeater node to the network node; and
communicate with the first UE and the second UE via the repeater node based at least in part on the full-duplex configuration.

13. The network node of claim 12, wherein the set of full-duplex parameters indicate whether the repeater node can maintain phase-continuity across time-division duplex symbols and sub-band full-duplex symbols.

14. The network node of claim 12, wherein the set of full-duplex parameters indicate a requested transition time between time-division duplex symbols and sub-band full-duplex symbols.

15. The network node of claim 12, wherein, to obtain the set of full-duplex parameters, the one or more processors are individually or collectively further operable to execute the code to cause the network node to:

obtain an indication that the repeater node supports multiplexing between mobile terminal unit (MT) communications and forward unit (FWD) communications, and one or more cross-link interference measurements associated with the MT communications and the FWD communications.

16. The network node of claim 12, wherein the one or more processors are individually or collectively further operable to execute the code to cause the network node to:

output a cross-link interference (CLI) measurement configuration for reporting of CLI measurements by the repeater node when full-duplex configuration is active.

17. A method for wireless communications at a repeater node, comprising:

transmitting, to a network node, a set of full-duplex parameters for full-duplex communications that are supported at the repeater node;

receiving, from the network node, a full-duplex configuration for communications between the network node and at least a first user equipment (UE) and a second UE, wherein the full-duplex configuration provides for downlink communications from the network node that are forwarded to the first UE contemporaneously with uplink communications that are forwarded from the second UE to the network node; and relaying communications between the network node, the first UE, and the second UE based at least in part on the full-duplex configuration.

18. The method of claim 17, wherein the set of full-duplex parameters indicate a filtering capability or a filtering response characteristic of the repeater node.

19. The method of claim 17, wherein the set of full-duplex parameters indicate one or more of a set of sub-bands the repeater node can filter, a width of a pass-band or a transition-band the repeater node can filter, a level of rejection in the transition-band or a stop-band, or any combinations thereof.

20. The method of claim 17, further comprising:

receiving a cross-link interference (CLI) measurement configuration for reporting of CLI measurements when full-duplex configuration is active.

\* \* \* \* \*